United States Patent
Goto

(10) Patent No.: US 9,926,386 B2
(45) Date of Patent: Mar. 27, 2018

(54) LIVING RADICAL POLYMERIZATION CATALYST, AND POLYMER PRODUCTION METHOD USING SAME

(71) Applicant: Kyoto University, Kyoto (JP)

(72) Inventor: Atsushi Goto, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 15/117,640

(22) PCT Filed: Feb. 10, 2015

(86) PCT No.: PCT/JP2015/053629
§ 371 (c)(1),
(2) Date: Aug. 9, 2016

(87) PCT Pub. No.: WO2015/122404
PCT Pub. Date: Aug. 20, 2015

(65) Prior Publication Data
US 2016/0347872 A1    Dec. 1, 2016

(30) Foreign Application Priority Data

Feb. 13, 2014  (JP) .................................. 2014-025589

(51) Int. Cl.
*C08F 4/08* (2006.01)
*C08F 4/04* (2006.01)
(Continued)

(52) U.S. Cl.
CPC ............... *C08F 4/08* (2013.01); *B01J 27/138* (2013.01); *C08F 4/04* (2013.01); *C08F 120/14* (2013.01);
(Continued)

(58) Field of Classification Search
CPC ........................................................ C08F 4/08
(Continued)

(56) References Cited

U.S. PATENT DOCUMENTS 6,306,995 B1   10/2001   Wang
9,018,325 B2    4/2015   Goto et al.
(Continued)

FOREIGN PATENT DOCUMENTS

JP   2007-092014    4/2007
WO   WO 2009/136510  11/2009
WO   WO 2013/027419   2/2013

OTHER PUBLICATIONS

Goto et al; Catalyst for living radical polymerization; Mar. 2010; Kyoto University, japan; Chem Abstract 152:335707 (It is 4 of 5 CAPLUS in 15117640 STN-CPC pdf).*

(Continued)

*Primary Examiner* — Duc Truong
(74) *Attorney, Agent, or Firm* — Cesari and McKenna, LLP

(57) ABSTRACT

An object of the present invention is to provide a living radical polymerization catalyst that is excellent in terms of safety and cost, and is applicable to various vinyl monomers, and to provide a method for producing a polymer using this living radical polymerization catalyst. The living radical polymerization catalyst contains at least one member selected from the group consisting of alkali metal halide compounds and alkaline earth metal halide compounds.

11 Claims, 3 Drawing Sheets

(51) Int. Cl.
  *C08F 120/14* (2006.01)
  *B01J 27/138* (2006.01)
  *C08F 4/40* (2006.01)
  *C08F 4/80* (2006.01)

(52) U.S. Cl.
  CPC ...... *C08F 2438/00* (2013.01); *C08F 2438/01* (2013.01)

(58) Field of Classification Search
  USPC .......................................................... 526/238
  See application file for complete search history.

(56) References Cited

U.S. PATENT DOCUMENTS

| | | |
|---|---|---|
| 2004/0014910 A1 | 1/2004 | Wang |
| 2007/0049715 A1 | 3/2007 | Goto et al. |
| 2011/0124832 A1 | 5/2011 | Goto et al. |
| 2014/0303334 A1 | 10/2014 | Goto et al. |

OTHER PUBLICATIONS

Supplementary Extended European Search Report issued for European Application No. 15 748 975.8.
Goto et al "Living Radical Polymerizations Using Sodium Iodide and Potassium Iodide as Catalysts" American Chemical Society vol. 1187, pp. 171-182, 2015.
Sarkar et al "Living Radical Polymerization with Alkali and Alkaline Earth Metal Iodides as Catalysts" Macromolecules vol. 49, pp. 5033-5042, 2016.
Tonnar et al "Use of Sodium Iodide as the Precursor to the Control Agent in Ab Initio Emulsion Polymerization" Angewandte Chemie vol. 120, pp. 1314-1317, 2008.

* cited by examiner

US 9,926,386 B2

LIVING RADICAL POLYMERIZATION CATALYST, AND POLYMER PRODUCTION METHOD USING SAME

CROSS REFERENCE TO RELATED APPLICATIONS

This application is the National Stage of International Application No. PCT/JP2015/053629, filed on Feb. 10, 2015, which claims priority to Japanese Application No. 2014-025,589, filed on Feb. 13, 2014. The contents of both applications are hereby incorporated by reference in their entirety.

TECHNICAL FIELD

The present invention relates to a catalyst used in a living radical polymerization reaction, and a method for producing a polymer using the catalyst.

BACKGROUND ART

In recent years, living radical polymerization methods are known as one of the techniques for polymerizing vinyl monomers. In a living radical polymerization method, it is generally relatively easy to control the molecular weight of the obtained vinyl polymers.

It is also possible to achieve a narrower molecular weight distribution of vinyl polymers contained in the obtained polymers, and it is thus possible to easily produce polymers having a ratio (Mw/Mn) of the weight average molecular weight (Mw) and the number average molecular weight (Mn), which is used as an index thereof, of 2 or less. The molecular weight and molecular weight distribution affect the physical characteristics of the obtained polymers, and living radical polymerization methods are thus expected to be used to control the physical characteristics of polymers.

In a living radical polymerization method, a living radical polymerization reaction using a transition metal complex catalyst has previously been known. As for transition metal complex catalysts, a complex must be obtained by using a metal, such as Cu, Ni, Re, Rh, or Ru, as a central metal, and designing a ligand. The use of a transition metal complex catalyst requires a large amount of the catalyst, and it is difficult to remove the catalyst after the polymerization reaction.

Many of these metals are highly toxic, possibly causing problems in terms of, for example, environment and toxicity in the organism. Additionally, ligands are in many cases expensive, or require complicated steps for synthesis.

To solve these problems, the present inventor et at has developed a nonmetallic element compound, such as an imidazolium iodide, as a living radical polymerization catalyst (Patent Literature (PTL) 1). The catalyst of PTL 1, which is free from a transition metal, is excellent in terms of safety as well as cost, since the use of expensive ligands is unnecessary.

However, the development of a living radical polymerization catalyst that is more excellent in terms of safety and cost, and is applicable to various vinyl monomers is still desired.

CITATION LIST

Patent Literature

PTL 1: WO2013/027419

SUMMARY OF INVENTION

Technical Problem

An object of the present invention is to provide a living radical polymerization catalyst that is excellent in terms of safety and cost, and is applicable to various vinyl monomers, and to provide a method for producing a polymer using this living radical polymerization catalyst.

Solution to Problem

The present inventor et al. conducted extensive research to achieve the above object, and found that the use of a catalyst containing an alkali metal halide or alkaline earth metal halide allows a living radical polymerization reaction to proceed. Based on this finding, the present inventor et al. conducted further research, and has accomplished the present invention.

More specifically, the present invention encompasses the modes described in the following Items 1 to 11.

Item 1. A living radical polymerization catalyst containing at least one member selected from the group consisting of alkali metal halide compounds and alkaline earth metal halide compounds (preferably consisting of at least one member selected from the group consisting of alkali metal halide compounds and alkaline earth metal halide compounds).

Item 2. The living radical polymerization catalyst according to Item 1, containing at least one member selected from the group consisting of alkali metal iodide compounds and alkaline earth metal iodide compounds (preferably consisting of at least one member selected from the group consisting of alkali metal iodide compounds and alkaline earth metal iodide compounds).

Item 3. The living radical polymerization catalyst according to Item 1 or 2, containing at least one member selected from the group consisting of sodium iodide and potassium iodide.

Item 4. A method for producing a polymer by living radical polymerization of one or more radically polymerizable monomers,
the method comprising:
a step of performing living radical polymerization using the living radical polymerization catalyst of any one of Items 1 to 3 (preferably a step of mixing one or more radically polymerizable monomers, a dormant species, and the living radical polymerization catalyst of any one of Items 1 to 3 to perform a living radical polymerization reaction).

Item 5. The production method according to Item 4, wherein the catalyst is used in an amount of 0.000125 to 1 mol (preferably 0.000125 to 0.05, and more preferably 0.000125 to 0.02 mol), per mole of the one or a more radically polymerizable monomers.

Item 6. The method for producing a polymer according to Item 4 or 5, wherein the living radical polymerization reaction is performed by further adding a polyether compound. (The method for producing a polymer according to Item 4 or 5, wherein the living radical polymerization reaction is further performed by adding a polyether compound.)

Item 7. The production method according to Item 6, wherein the polyether compound is used in an amount of 1 mol or more, per mole of the living radical polymerization catalyst, and 10000 parts by weight or less, per 100 parts by weight of the one or more radically polymerizable monomers.

Item 8. The production method according to Item 6 or 7, wherein the polyether compound is a dialkoxy polyalkylene glycol or a crown ether.

Item 9. The production method according to Item 4 or 5, wherein the living radical polymerization reaction is further performed by adding a solvent (The production method according to Item 4 or 5, wherein the living radical polymerization reaction is performed by further adding a solvent.)

Item 10. The production method according to any one of Items 4 to 9, wherein the method is performed without a transition metal catalyst.

Item 11. Use of at least one member selected from the groups consisting of alkali metal halide compounds and alkaline earth metal halide compounds, as a living radical polymerization reaction catalyst (preferably at least one member selected from the groups consisting of alkali metal halide compounds and alkaline earth metal halide compounds).

Advantageous Effects of Invention

The living radical polymerization catalyst and production method of the present invention are capable of producing a polymer having a narrow molecular weight distribution without requiring a transition metal, and are thus capable of more safely producing a polymer having a narrow molecular weight distribution.

Further, the living radical polymerization catalyst and production method of the present invention are capable of reducing the costs incurred other than the cost of the monomers (e.g., the cost for a catalyst), making it possible to more cheaply produce a polymer having a narrow molecular weight distribution.

DESCRIPTION OF EMBODIMENTS

Figure 1:
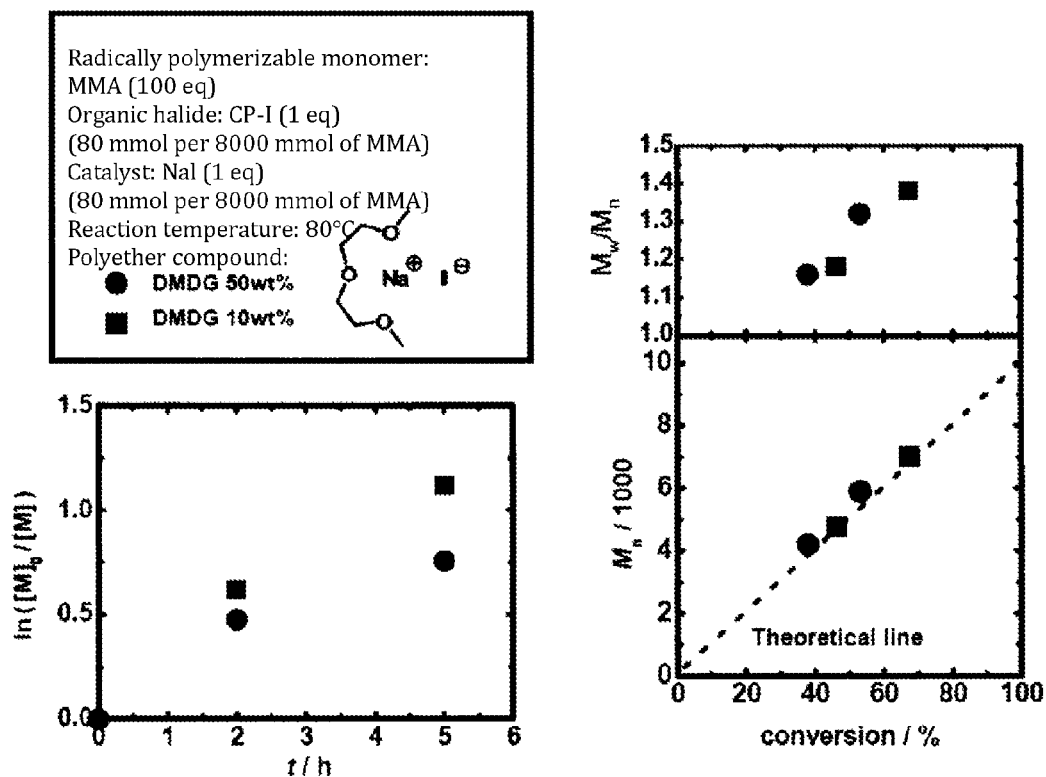
FIG. 1 shows graphs plotting the "reaction time" versus (In[M]$_0$/[M])," the "rate of polymerization" versus "Mw/Mn," and the "rate of polymerization" versus "Mn/1000," with respect to the amount of diethylene glycol diethyl ether used.

The following describes the present invention in detail.

In the present invention, the tem "contain" is an expression encompassing the meanings of "include," "consist essentially of," and "consist of."

In the present invention, the term "alkyl" refers to a monovalent group obtained by removing one hydrogen atom from a chain or cyclic aliphatic hydrocarbon (alkane). In particular, a monovalent group obtained by removing one hydrogen atom from a chain aliphatic hydrocarbon (chain alkane) is referred to as "chain alkyl," and a monovalent group obtained by removing one hydrogen atom from a cyclic aliphatic hydrocarbon (cycloalkane) is referred to as "cycloalkyl."

An alkyl group is preferably $C_{1-30}$ alkyl, and more preferably $C_{1-20}$ alkyl. Likewise, the tem "alkylene" refers to a divalent group obtained by removing one more hydrogen atom from an alkyl group.

The term "lower alkyl" or "lower alkylene" preferably refers to $C_{1-10}$ alkyl or alkylene, more preferably $C_{1-5}$ alkyl or alkylene, and still more preferably $C_{1-3}$ alkyl or alkylene.

The "lower alkyl" is encompassed in "alkyl," while the "lower alkylene" is encompassed in "alkylene."

Specific examples of lower alkyl groups include methyl, ethyl, n-propyl, and isopropyl. Specific examples of lower alkylene groups include methylene, ethylene, propylene, and isopropylene.

The tem "alkoxy" refers to an alkyloxy group having the above alkyl. When the alkyl above is represented by "alkyl-," "alkoxy" is represented by "alkyl-O—."

Likewise, the terms "chain alkoxy," "cycloalkoxy," and "lower alkoxy" refer to alkyloxy groups respectively having the above chain alkyl, cycloalkyl, and lower alkyl.

The term "aryl" refers to a group which is generated after one hydrogen atom bound to a ring of an aromatic hydrocarbon is removed. The number of the aromatic hydrocarbon rings constituting an aryl group may be one, or two or more.

When two or more rings are present, these rings may be fused or not fused. Specific examples thereof include phenyl, naphthyl, anthracenyl, biphenyl, and the like.

The term "heteroaryl" refers to a group in which elements constituting the ring skeleton of an aromatic ring of aryl include a heteroatom in addition to carbon. Examples of heteroatoms include oxygen, nitrogen, sulfur, and the like.

The number of heteroatoms in the aromatic ring is not particularly limited. The aromatic ring may contain, for example, only one heteroatom, or may contain two or more identical or different heteroatoms.

Examples of "halogen (atom)" include fluorine (atom), chlorine (atom), bromine (atom), and iodine (atom).

The term "alkylcarboxyl" refers to a group in which a carboxyl group is bound to the above alkyl group. When the alkyl is represented by "alkyl-," the alkylcarboxyl refers to a group represented by "alkyl-CO$_2$—."

1. Living Radical Polymerization Catalyst

The living radical polymerization catalyst of the present invention contains at least one member (hereinafter sometimes simply referred to as a "main group-metal halide compound") selected from the group consisting of alkali metal halide compounds and alkaline earth metal halide compounds.

Examples of the alkali metal atoms of the alkali metal halide compounds include lithium, sodium, potassium, rubidium, cesium, and francium. Examples of the alkaline earth metal atoms of the alkaline earth metal halide compounds include beryllium, magnesium, calcium, strontium, barium, and radium.

Of these, sodium, potassium, cesium, magnesium, calcium, and the like are preferable, and sodium and potassium are particularly preferable.

Examples of the halogen atoms contained in the main group-metal halide compounds include fluorine, chlorine, bromine, and iodine. Of these, bromine or iodine is preferable, and iodine is particularly preferable to obtain a narrow molecular weight distribution.

The living radical polymerization catalyst of the present invention is preferably an alkali metal bromide compound, an alkali metal iodide compound, an alkaline earth metal bromide compound, or an alkaline earth metal iodide compound, more preferably an alkali metal iodide compound or an alkaline earth metal iodide compound, and particularly preferably sodium iodide, potassium iodide, cesium iodide, magnesium iodide, or calcium iodide.

In the present invention, commercially available products or those synthesized by known methods may be used as alkali metal halide compounds and alkaline earth metal halide compounds. Commercially available products, when used, may be used as is.

The living radical polymerization catalyst of the present invention may be used alone, or in a combination of two or more.

As described above, the living radical polymerization catalyst of the present invention contains a main group-metal halide compound (preferably consists of a main group-metal halide compound), and thus has very low toxicity.

Further, the living radical polymerization catalyst of the present invention is available at a very low cost and is substantially negligible, when compared with the cost of the monomers used for polymerization, making it possible to reduce the cost for producing a polymer.

For this reason, the living radical polymerization catalyst of the present invention is suitable for industrial use.

2. Living Radical Polymerization Reaction

The method for producing a polymer of the present invention is capable of producing a polymer by a living radical polymerization reaction using the living radical polymerization catalyst described above.

Below, in the present invention, the term "living radical polymerization" refers to a polymerization reaction in which a chain transfer reaction and a termination reaction do not substantially occur in a radical polymerization reaction, and the growing chain end maintains the activity even after the monomers have been exhaustively reacted.

In the method for producing a polymer of the present invention, the reaction may be performed by stirring one or more radically polymerizable monomers and an organic halide (a dormant species), together with the living radical polymerization catalyst described above, in the presence or absence of a solvent.

In the production method of the present invention, a further addition of a radical initiator improves the rate of the reaction.

As described below, the organic halide (dormant species) may be produced by a reaction of an azo-based radical initiator and a halogen molecule in the reaction system. In this case, it is sufficient if one or more radically polymerizable monomers, an azo-based radical initiator, and a halogen molecule are stirred with the living radical polymerization catalyst described above, in the presence or absence of a solvent.

The use of the catalyst of the present invention is assumed to cause the abstraction of halogen from a dormant species (e.g., Polymer-X) in the living radical polymerization reaction, allowing the polymerization reaction to proceed.

2.1. Radically Polymerizable Monomer

The method for producing a polymer of the present invention uses one or more radically polymerizable monomers as a monomer. A radically polymerizable monomer refers to an unsaturated bond-containing monomer that is capable of undergoing radical polymerization in the presence of an organic radical.

Such an unsaturated bond may be a double bond or triple bond. Specifically, the polymerization method of the present invention can use arbitrary monomers that have been previously known to undergo living radical polymerization.

More specifically, monomers called vinyl-based monomers may be used. A vinyl-based monomer is a general name for monomers that are represented by Formula (1):

$$CHR^1=CR^2R^3 \qquad (1)$$

wherein $R^1$, $R^2$, and $R^3$ each represent a hydrogen atom or an organic group.

The monomers represented by Formula (1) encompass the monomers exemplified below.

The following are suitably used as vinyl-based monomers:

styrene and derivatives thereof ($R^1$ and $R^2$ represent hydrogen, and $R^3$ represents optionally substituted phenyl);

acrylic acid ($R^1$ and $R^2$ represent hydrogen, and $R^3$ represents carboxyl);

acrylamide ($R^1$ and $R^2$ represent hydrogen, and $R^3$ represents —$CONH_2$) and derivatives thereof;

acrylates (acrylic esters or acrylic acid salts);

methacrylic acid ($R^1$ represents hydrogen, $R^2$ represents methyl, and $R^3$ represents carboxyl) (MAA);

methacrylamide ($R^1$ represents hydrogen, $R^2$ represents methyl, and $R^3$ represents —$CONH_2$) (MAAm) and derivatives thereof; and methacrylates (methacrylic acid esters or methacrylic acid salts).

Specific examples of styrene and derivatives thereof include styrene (St);

o-, m-, or p-methoxystyrene;

o-, m-, or p-t-butoxystyrene;

o-, m-, or p-chloromethylstyrene;

o-, m-, or p-chlorostyrene;

o-, m-, or p-hydroxystyrene;

o-, m-, or p-styrenesulfonic acid and derivatives thereof;

o-, m-, or p-sodium styrenesulfonic acid;

o-, m-, or p-styreneboronic acid and derivatives thereof; and the like.

Specific examples of acrylamide and derivatives thereof include acrylamide, N-isopropylacrylamide, N,N-dimethylacrylamide, N-methylolacrylamide, N-hydroxymethylacrylamide, and the like.

Specific examples of acrylates include alkyl acrylates, such as methyl acrylate, ethyl acrylate, propyl acrylate, n-butyl acrylate, t-butyl acrylate, hexyl acrylate, 2-ethylhexyl acrylate, n-octyl acrylate, nonyl acrylate, decanyl acrylate, and lauryl acrylate;

arylalkyl acrylates, such as benzyl acrylate;

a tetrahydrofurfuryl acrylate;

epoxyalkyl acrylates, such as glycidyl acrylate;

cycloalkyl acrylates, such as cyclohexyl acrylate;

alkoxyalkyl acrylates, such as 2-methoxyethyl acrylate and butoxyethyl acrylate;

hydroxyalkyl acrylates, such as 2-hydroxyethyl acrylate and 2-hydroxypropyl acrylate;

polyalkylene glycol acrylates, such as diethylene glycol acrylate and polyethylene glycol acrylate;

alkoxy polyalkylene glycol acrylates, such as methoxy tetraethylene glycol acrylate and methoxy polyethylene glycol acrylate;

dialkylaminoalkyl acrylates, such as 2-(dimethylamino) ethyl acrylate;

3-chloro-2-hydroxypropyl acrylate;

2-hydroxy-3-phenoxypropyl acrylate; and the like.

It is also possible to use fluoroalkyl acrylate in which the alkyl group of alkyl acrylate is substituted with at least one fluorine atom, and a compound in which the alkyl group of alkyl acrylate is substituted with at least one tris(trialkylsiloxy)silyl group.

In addition, it is possible to use ion liquid-type acrylates such as 2-(N,N-diethyl-N-methylamino)ethyl acrylate$^+$/trifluorosulfonyliminium $(N(CF_3SO_2)_2^-)$ salt, 2-(N-ethyl-N-methyl-N-hydrogenated amino)ethyl acrylate$^+$/trifluorosulfonyliminium $(N(CF_3SO_2)_2^-)$ salt, 1-ethyl-3-methylimidazolium acrylate$^+$/fluorohydrogenation $((FH)_nF^-)$ salt, and the like.

Specific examples of methacrylamide and derivatives thereof include methacrylamide (MAAm), N-isopropylmethacrylamide, N,N-dimethylmethacrylamide, N-methylolmethacrylamide, N-hydroxyethylmethacrylamide, and the like.

Specific examples of methacrylates include alkyl methacrylates, such as methyl methacrylate (MMA), ethyl methacrylate, propyl methacrylate, n-butyl methacrylate, t-butyl methacrylate, hexyl methacrylate, 2-ethylhexyl methacrylate, n-octyl methacrylate, nonyl methacrylate, decanyl methacrylate (LMA), and lauryl methacrylate;

arylalkyl methacrylates, such as benzyl methacrylate (BzMA);

tetrahydrofurfuryl methacrylate;

epoxyalkyl methacrylates, such as glycidyl methacrylate;

cycloalkyl methacrylates, such as cyclohexyl methacrylate;

alkoxyalkyl methacrylates, such as 2-methoxyethyl methacrylate and butoxyethyl methacylate;

hydroxyalkyl methacrylates, such as 2-hydroxyethyl methacrylate (HEMA), 2-hydroxypropyl methacrylate, and glycerol monomethacrylate;

polyalkylene glycol methacrylates, such as diethylene glycol methacrylate and polyethylene glycol methacrylate;

alkoxy polyalkylene glycol methacrylates, such as methoxy tetraethylene glycol methacrylate and methoxy polyethylene glycol methacylate (PEGMA);

dialkylaminoalkyl methacrylates, such as 2-(dimethylamino)ethyl methacrylate (DMAEMA);

alkoxysilyl alkyl methacrylates, such as 3-(trimethoxysilyl)propyl methacrylate;

3-chloro-2-hydroxypropyl methacrylate;

2-hydroxy-3-phenoxypropyl methacrylate; and the like.

It is also possible to use fluoroalkyl methacrylates, such as 2,2,3,4,4,4-hexafluorobutyl methacrylate (HFBMA), in which the alkyl group of alkyl methacylate is substituted with fluorine atoms, and compounds such as 3-[[tris(trimethylsiloxy)silyl]propyl methacrylate (MOPES), in which the alkyl group of alkyl methacylate is substituted with a tris(trialkylsiloxy)silyl group.

In addition, it is possible to use ion liquid-type methacrylates such as 2-(N,N-diethyl-N-methylamino)ethyl methacrylate$^+$/trifluorosulfonyliminium $(N(CF_3SO_2)_2^-)$ salt, 2-(N-ethyl-N-methyl-N-hydrogenated amino)ethyl methacrylate$^+$/trifluorosulfonyliminium $(N(CF_3SO_2)_2^-)$ salt, 1-ethyl-3-methylimidazolium methacrylate$^+$/fluorohydrogenation $((FH)_nF^-)$ salt, N-ethyl-N-methylpyrrolidinium methacrylate$^+$/fluorohydrogenation $((FH)_nF^-)$ salt, and the like.

In the present invention, the reaction appropriately proceeds, even when both $R^2$ and $R^3$ represent a carboxyl group or a carboxylate-containing group.

Specific examples include itaconic acids, such as itaconic acid (ITA), dimethyl itaconic acid (Me$_2$ITA), and monobutyl itaconic acid (BuITA), and monoalkyl esters thereof and dialkyl esters thereof.

In the present invention, it is also possible to use a monomer with two or more double bonds (e.g., vinyl group and isopropenyl group).

Specific examples include diene compounds (e.g., butadiene and isoprene), compounds having two allyl groups (e.g., diallyl phthalate), compounds having two methacryl groups (e.g., ethylene glycol dimethacrylate), compounds having two acrylic groups (e.g., ethylene glycol diacrylate), and the like.

In the present invention, vinyl-based monomers other than those mentioned above may also be used.

Specific examples include vinyl esters (e.g., vinyl acetate, vinyl propionate, vinyl benzoate, vinyl acetate), styrene derivatives other than those mentioned above (e.g., α-methylstyrene), vinyl ketones (e.g., vinyl methyl ketone, vinyl hexyl ketone, methyl isopropenyl ketone), N-vinyl compounds (e.g., N-vinyl pyrrolidone, N-vinyl pyrrole, N-vinyl carbazole, N-vinyl indole), acrylonitrile (AN), methacrylonitrile, maleic acid and derivatives thereof (e.g., maleic anhydride), halogenated vinyls (e.g., vinyl chloride, vinylidene chloride, tetrachloroethylene, hexachloropropylene, vinyl fluoride), olefins (e.g., ethylene, propylene, 1- or 2-butene, 1-hexene, cyclohexene), and the like.

These radically polymerizable monomers may be used alone, or in a combination of two or more.

The use of the catalyst of the present invention allows a polymerization reaction to suitably proceed even with the use of a hydroxyl group-containing monomer.

The polymerization reaction also appropriately proceeds even with the use of a monomer having two carboxyl groups and/or two carboxylate groups, or one carboxyl group and one carboxylate group.

In the present invention, the amount of the one or more radically polymerizable monomers used may be appropriately determined according to the amounts of the catalyst and the organic halide (dormant species) used, and the molecular weight of the target polymer.

2.2. Living Radical Polymerization Catalyst

The living radical polymerization catalyst used in the present invention is as described above.

In the method of the present invention for producing a polymer, the living radical polymerization catalyst is used in an amount of preferably 0.000125 or more, per mole of the one or more radically polymerizable monomers, from the viewpoint of the rate of the reaction.

From the economic viewpoint, the living radical polymerization catalyst is used in an amount of preferably 1 mol or less, more preferably 0.05 mol or less, and particularly preferably 0.02 mol or less, per mole of the one or more radically polymerizable monomers.

2.3. Organic Halide (Dormant Species)

In the present invention, an organic halide (dormant species) having a carbon-halogen bond is added, and halogen that is provided to the growing chain by the organic halide is used as a protecting group.

Such organic halides are relatively inexpensive. Therefore, it is more advantageous than other known compounds used as protecting groups in living radical polymerization. It is also possible to use a low-molecular-weight dormant species in which a halogen is bound to an element other than carbon, if necessary.

An organic halide used as a dormant species is not particularly limited, as long as it has at least one carbon-halogen bond in the molecule and acts as a dormant species. However, it is generally preferable to use an organic halide having one or two halogen atoms in one molecule.

With regard to an organic halide to be used as a dormant species, a carbon radical generated by elimination of a halogen is preferably unstable. Thus, as an organic halide to be used as a dormant species, it is not suitable to use an organic halide in which a carbon atom that would become a carbon radical when a halogen is eliminated is bound to two or more substituents that stabilize the carbon radical.

However, an organic halide in which a carbon atom that would become a carbon radical is bound to one substituent that stabilizes the carbon radical is likely to achieve moderate radical stability, and can thus be used as a dormant species.

The number of hydrogen atoms carried by the carbon to which the halogen atom of the organic halide used as a dormant species is bound (hereinafter referred to as "the 1-position carbon of the organic halide" for convenience) is preferably two or less, and more preferably one or less, and it is even more preferable that the carbon does not have any hydrogen atom.

Further, the number of halogen atoms bound to the 1-position carbon of the organic halide is preferably three or less, more preferably two or less, and particularly preferably one.

It is preferable that one or more carbon atoms are bound to the 1-position carbon of the organic halide used as a dormant species, and it is particularly preferable that two or three carbon atoms are bound thereto.

The halogen atom of the organic halide used as a dormant species is preferably chlorine, bromine, or iodine, and more preferably bromine or iodine.

From the viewpoint of making molecular weight distribution narrow, most preferred is iodine.

Bromine can also be preferably used. Bromine compounds are generally more stable than iodine compounds, and are thus advantageous since it is easy to store lower-molecular-weight dormant species, and since the necessity of removing terminal halogen from a produced polymer is relatively low.

Further, the halogen atom in the organic halide may be identical to or different from the halogen atom in the main group-metal halide compound used as a catalyst. Even when the halogen atoms are different, it is possible that the halogen atom in the organic halide and the halogen atom in the main group-metal halide compound used as a catalyst are exchanged with each other.

However, the halogen atom in the organic halide used as a dormant species is preferably identical to the halogen atom in the main group-metal halide compound used as a catalyst, because in this case, it is easier to exchange the halogen atoms between the organic halide used as a dormant species and the main group-metal halide compound used as a catalyst.

Specifically, for example, the organic halide used as a dormant species is a compound represented by Formula (2):

$$CR^4R^5R^6X^1 \qquad (2)$$

wherein $R^4$ and $R^5$ are identical or different and each represents halogen, hydrogen, or alkyl; $R^6$ is halogen, hydrogen, alkyl, aryl, heteroaryl, alkylcarboxyl, or cyano; $X^1$ is halogen; and $R^6$ may be identical to or different from $R^4$ and $R^5$.

$R^4$ and $R^5$ are preferably hydrogen or lower alkyl, and mole preferably hydrogen or methyl.

$X^1$ is halogen, and preferably chlorine, bromine, or iodine, mole preferably bromine or iodine, and most preferably iodine.

When halogen is present in $R^4$ to $R^6$, $X^1$ may be identical to or different from the halogen in $R^4$ to $R^6$.

The halogen atom of $X^1$ may be identical to or different from the halogen atom in the main group-metal halide compound used as a catalyst.

$R^4$ to $R^6$ and $X^1$ above are selected independently from one another. However, it is preferable that there is no halogen atom or one halogen atom in $R^4$ to $R^6$ (i.e., it is preferable that the organic halide contains one or two halogen atoms in the compound).

In a preferable embodiment, the organic halide used as a low-molecular-weight dormant species is an alkyl halide or substituted alkyl halide, and more preferably a substituted alkyl halide.

In this regard, the alkyl is preferably secondary alkyl, and more preferably tertiary alkyl.

In the alkyl halide or substituted alkyl halide used as a low-molecular-weight dormant species, the number of carbon atoms of the alkyl is preferably 2 or 3.

Therefore, the organic halide used as a low-molecular-weight dormant species is still more preferably substituted ethyl halide or substituted isopropyl halide.

Examples of the substituents in the substituted alkyl halide used as a low-molecular-weight dormant species include substituents that stabilize radicals, such as phenyl, carboxyl, amide, ester, and cyano.

Other specific examples of the organic halide used as a dormant species include methyl chloride, methylene chloride, chloroform, chloroethane, dichloroethane, trichlorethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromoethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloromethane, chlorodiiodoethane, diiodopropane, chloroiodopropane, iododibromoethane, bromoiodopropane, 2-iodo-2-polyethyleneglycosylpopane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl 2-iodoisobutylate, 2-iodo-2-methylpropanamide, 2-iodo-2,4-dimethylpentane, 2-iodo-2-cyanobutanol, 2-iodo-2-methyl-N-(2-hydroxyethyl)propionamide 4-methylpentane, 2-iodo-2-methyl-N-(1,1-bis(hydroxymethyl)-2-hydroxyethyl)propionamide 4-methylpentane, 2-iodo-2-(2-imidazolin-2-yl)propane, 2-iodo-2-(2-(5-methyl-2-imidazolin-2-yl)propane, iodobenzylcyanide (PhCN-I), ethyl 2-iodophenyl acetate (PhE-I), diethyl 2-iodo-2-methylmalonate (EEMA-I), 2-iodo-2-cyanopropane (CP-I, 1-iodo-1-cyanoethane (CE-I, 1-iodo-1-phenylethane (PE-I), ethyl 2-iodoisobutyrate (EMA-I), ethyl 2-iodovalerate (EPA-I), ethyl 2-iodopropionate (EA-I), ethyl 2-iodoacetate (E-I), 2-iodoisobutyrate (MAA-I), hydroxyethyl 2-iodoisobutyrate (HEMA-I), 2-iodopropionic acid amide (AAm-I), ethylene glycol bis(2-iodoisobutyrate) (EMA-II), diethyl 2,5-diiodoadipate (EA-II), glycerol tris(2-iodoisobutyrate) (EMA-III), 6-(2-iodo-2-isobutyroxy)hexyl triethoxysilane (IHE), and the like.

These halides may be used alone, or in a combination of two or more.

Preferable specific examples of the organic halide used as a low-molecular-weight dormant species include PhCN-I, PhE-I, EEMA-I, CP-I, CE-I, PE-I, EMA-I, EPA-I, EA-I, E-I, MAA-I, HEMA-I, AAm-I, EMA-II, EA-II, EMA-II, IHE, and the like.

The following are the structural formulas thereof.

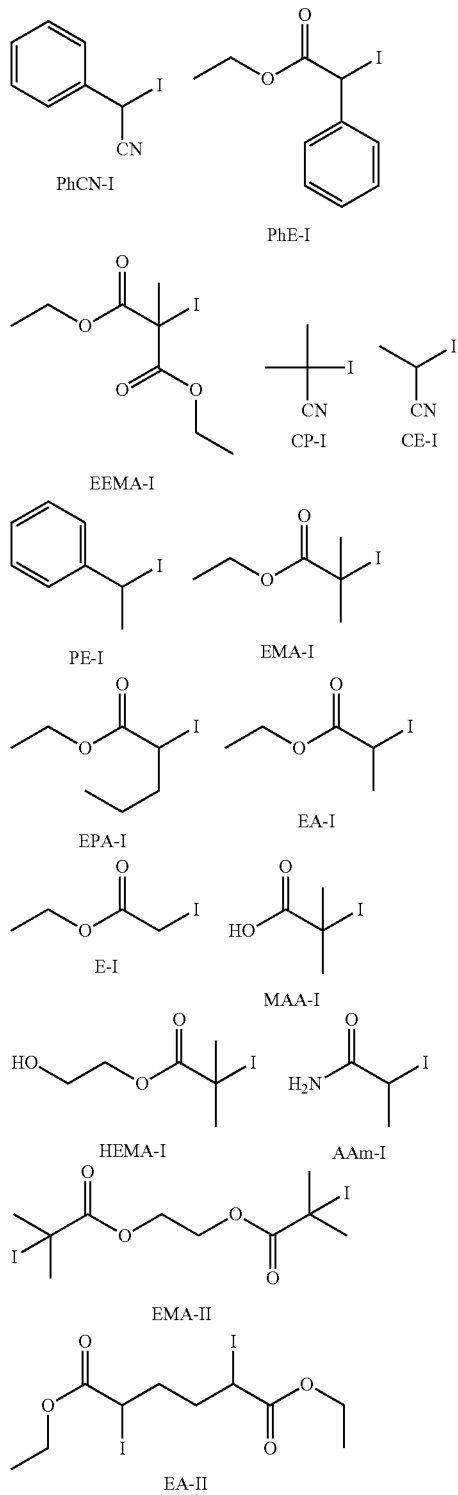

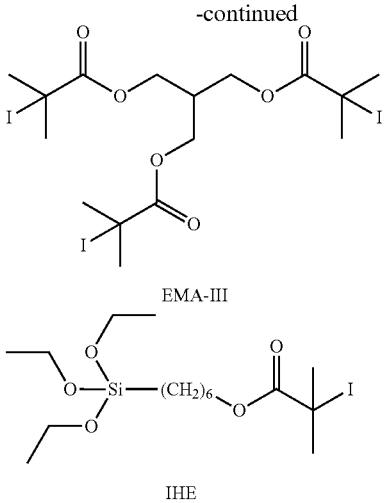

According to the method of the present invention, the organic halide used as a dormant species is not used as a solvent, and is thus not necessarily used in such a large amount as to provide an effect as a solvent.

Thus, the amount of the organic halide used as a dormant species may be adjusted to an amount smaller than the so-called "solvent amount" (that refers to an amount needed to achieve the effect as a solvent).

In the method of the present invention, the organic halide used as a dormant species is used to provide a halogen as a protecting group to a growing chain as described above; thus, it is sufficient so long as a sufficient amount of halogen is provided to the growing chains in the reaction system.

Specifically, for example, in the method of the present invention, the organic halide used as a dormant species is used in an amount, relative to a catalyst, of preferably 0.001 mol or more, more preferably 0.01 mol or more, and particularly preferably 0.03 mol or more, per mole of the main group-metal halide compound used as a catalyst in the polymerization reaction system.

Further, the organic halide used as a dormant species is preferably 1000 mol or less, more preferably 300 mol or less, and particularly preferably 100 mol or less, per mole of the main group-metal halide compound used as a catalyst in the polymerization system.

In the method of the present invention, the amount of the organic halide used as a dormant species, relative to one or more radically polymerizable monomers (monomers), may be suitably adjusted according to the length of the target polymer chain.

It is generally, for example, 0.0001 mol or more, per mole of one or more radically polymerizable monomers (monomers). Further, for example, it is 1 mol or less, per mole of one or more radically polymerizable monomers (monomers).

The organic halides used as a dormant species are mostly known compounds, and reagents and the like that are commercially available from reagent sales companies and the like are usable as it is. They may also be synthesized by known methods.

An organic halide generated in situ (i.e., within the reaction solution) by introducing the starting materials thereof may also be used as a dormant species in this polymerization method.

For example, an azo-based radical initiator (e.g., azobis(isobutyronitrile)) described below and a halogen molecule (e.g., iodine molecule ($I_2$)) are introduced as starting materials, followed by reaction of these materials to generate an organic halide (e.g., CP-I, which is an alkyl iodide) in situ; the thus-generated organic halide may be used as a dormant species in this polymerization method.

As the organic halide used as a dormant species, it is also possible to use a compound that is immobilized on a surface such as an inorganic or organic solid surface, or an inorganic or organic molecular surface.

For example, an organic halide immobilized on a silicon substrate surface, a polymer film surface, an inorganic or organic microparticle surface, a pigment surface, or the like, may be used. The immobilization is achieved by, for example, chemical binding, physical binding, or the like.

As a dormant species, it is also possible to use a compound having a plurality of halogenated alkyl moieties. With the use of a compound having two halogenated alkyl moieties, for example, a BAB-type triblock copolymer is synthesized by block-copolymerization of two types of monomers, monomer A and monomer B.

As the compound having a plurality of halogenated alkyl moieties, it is preferable to use a compound having a structure in which a halogen is bound to alkyl in an organic compound. It is also possible to use, if necessary, a compound having a structure in which a plurality of halogenated alkyl moieties are bound to an inorganic compound.

The compound having a plurality of halogenated alkyl moieties may be a compound having a low molecular weight or may be a compound having a high molecular weight. That is, a polymer or supramolecular compound may also be used. Further, as a compound having a plurality of halogenated alkyl moieties, a compound that does not dissolve in a reaction solution can be used, keeping it a solid, to grow a polymer chain from a surface of the solid.

Accordingly, compounds having various structures may be used as a compound having a plurality of halogenated alkyl moieties. The use of compounds having various structures enables synthesize of various branched polymers including star-type, comb-type, and surface-grafted-type polymers and the like.

In addition, a polymer compound having a halogenated alkyl moiety at a terminal may be used to synthesize a block copolymer.

According to this method, for example, a block copolymer of a polymer synthesized by a method other than living radical polymerization and a polymer synthesized by living radical polymerization may also be synthesized.

2.4. Radical Initiator

In the method of the present invention, the addition of a small amount of a radical initiator, as required, can promote the polymerization reaction.

The use of a radical initiator, which increases the amount of radicals in the reaction solution, is presumed to increase the rate of polymerization.

As a radical initiator, those known to be used for a radical reaction may be used. Examples include azo-based radical initiators, peroxide-based radical initiators, and the like.

Specific examples of azo-based radical initiators include azobis(isobutyronitrile) (AIBN), 2,2'-azobis(2,4-dimethylvaleronitrile) (V65), 2,2'-azobis(4-methoxy-2,4-dimethylvaleronitrile) (V70), dimethyl 2,2'-azobis(2-methylpropionate) (V601), 2,2'-azobis(2-methylbutyronitrile) (V59), 1,1'-azobis(cyclohexane-1-carbonitrile) (V40), 2,2'-azobis[N-(2-propenyl)-2-methylpropionamide)] (VF96), and 2,2'-azobis (N-butyl-2-methylpropionamide) (VAm110).

Specific example of peroxide-based radical initiators include benzoyl peroxide, dicumyl peroxide, t-butyl peroxybenzoate (BPB), di(4-t-butylcyclohexyl)peroxydicarbonate (PERKADOX16), and potassium peroxodisulfate.

The amount of the radical initiator used is not particularly limited, and is preferably 500 millimoles or less, per 1 liter of the reaction solution.

2.5. Polyether Compound

In the production method of the present invention, it is preferable to add a polyether compound, as required. The addition of a polyether compound promotes a living radical polymerization reaction performed with the use of the catalyst of the present invention.

The reason why a polyether compound promotes the living radical polymerization reaction in the present invention is presumably because a polyether compound has a function to temporarily trap an alkali metal cation or alkaline earth metal cation contained in the catalyst of the present invention.

Examples of such a polyether compound include dialkoxy polyalkylene glycols, such as diethylene glycol dimethyl ether (methyl diglyme; DMDG), diethylene glycol diethyl ether (ethyl diglyme), triethylene glycol dimethyl ether (methyl triglyme), and triethylene glycol diethyl ether (ethyl triglyme);

crown ethers, such as 12-crown-4, 15-crown-5, 18-crown-6; and the like.

As a crown ether, those having a suitable ring may be selected according to the type of the alkali metal or alkaline earth metal contained in the catalyst. For example, 12-crown-4 may be selected for lithium, 15-crown-5 may be selected for sodium, and 18-crown-6 may be selected for potassium.

Of these, diethylene glycol dimethyl ether (methyl diglyme; DMDG), diethylene glycol diethyl ether (ethyl diglyme), triethylene glycol dimethyl ether (methyl triglyme), triethylene glycol diethyl ether (ethyl triglyme), and the like, which are inexpensively available, are preferable.

The polyether compound described above may be added in a small amount, or in a solvent amount. When the polyether compound is added in a solvent amount, the polyether compound may be used in place of the solvent mentioned later.

The specific upper limit of the amount of the polyether compound used may be a solvent amount, and is, for example, preferably 10000 parts by weight or less, more preferably 2000 parts by weight or less, still more preferably 1000 parts by weight or less, and particularly preferably 500 parts by weight or less, per 100 parts by weight of the one or more radically polymerizable monomer.

The lower limit of the amount of the polyether compound used is not particularly limited, and is, for example, preferably 1 mol or more, per mole of the alkali metal atom and alkaline earth metal atom contained in the catalyst to be used.

2.6. Solvent

A solvent may be used, as required, when a reaction mixture does not become a solution because, for example, a radically polymerizable monomer etc. is in solid form at a reaction temperature.

As a solvent, solvents that have been previously used for living radical polymerization may be used as is.

Specific examples include a water;

alcohols, such as ethanol;

carbonates, such as ethylene carbonate (EC);

esters, such as butyl acetate;

amides, such as N,N-dimethyl 2-methoxyethylamide (DMMEA) and dimethylformamide (DMF); and the like.

It is also possible to use the polyether compound mentioned above as a solvent.

The amount of the solvent, when used, is not particularly limited as long as a polymerization reaction is appropriately performed.

However, to prevent the reaction solution from becoming unable to be stirred due to an increase in the viscosity, the amount of the solvent, when used, is preferably 1 part by weight or more, more preferably 10 parts by weight or more, and still more preferably 50 parts by weight or more, per 100 parts by weight of one or more radically polymerizable monomers.

Further, to prevent the reaction rate from decreasing due to a reduction in the radically polymerizable monomer concentration, it is preferably 10000 parts by weight or less, more preferably 2000 parts by weight or less, still more preferably 1000 parts by weight or less, and particularly preferably 500 parts by weight or less, per 100 parts by weight of one or more radically polymerizable monomer.

The solvent above may be miscible or not miscible with a radically polymerizable monomer. The use of a solvent miscible with a radically polymerizable monomer makes it possible to perform a polymerization reaction in a homogeneous solvent system.

The use of a solvent that is not miscible with a monomer makes it possible to perform emulsion polymerization, dispersion polymerization, or suspension polymerization. For example, when styrene or methacrylate is used as a monomer while water is used as a solvent, emulsion polymerization, dispersion polymerization, or suspension polymerization may be performed.

2.7. Other Additives

Known additives and the like may be added to the various materials mentioned above used for living radical polymerization, in their required amounts, as required. Examples of such additives include, for example, a polymerization inhibitor and the like.

2.8. Reaction Conditions

The reaction temperature in the method of the present invention is not particularly limited as long as a living radical polymerization reaction proceeds.

For example, it is preferably 10° C. or higher, more preferably 20° C. or higher, still more preferably 30° C. or higher, furthermore preferably 40° C. or higher, and particularly preferably 50° C. or higher.

The temperature is also preferably 130° C. or lower, mole preferably 120° C. or lower, still more preferably 110° C. or lower, furthermore preferably 105° C. or lower, and particularly preferably 100° C. or lower.

The reaction temperature of 130° C. or lower prevents the molecular weight of the resulting polymer from being much lower than the target value. Such a reaction range also reduces the costs for healing facilities and transportation.

The reaction temperature of 10° C. or higher allows the reaction mixture to be prepared or stored at a temperature close to room temperature.

From these viewpoints, the reaction temperature of slightly higher than room temperature and not overly high (e.g., between 30° C. or higher and 100° C. or lower) is very preferable in terms of practicality.

As described above, in the present invention, the reaction may be carried out at a relatively low temperature. The reaction at such a low temperature (in particular, 80° C. or lower) may be carried out while suppressing the side reaction, i.e., while suppressing the removal of iodine from a terminal of a dormant species.

Thus, such a reaction temperature is very advantageous for synthesizing a polymer having a high molecular weight.

The reaction time in the method of the present invention is not particularly limited, and may be appropriately set according to the molecular weight of the target polymer and the amount of catalyst.

For example, it is generally preferably 15 minutes or more, more preferably 30 minutes or more, and still more preferably 1 hour or more.

The upper limit of the reaction time is not particularly limited; however, in terms of operating efficiency, it is generally preferably 5 days or less, more preferably 3 days or less, still more preferably 2 days or less, and particularly preferably 1 day or less.

In the method of the present invention, a polymerization reaction may be carried out in the presence of air. The reaction may also be carried out in an inert atmosphere, such as nitrogen or argon, if necessary.

The polymer produced by the method of the present invention may be a homopolymer or a copolymer (e.g., a copolymer and a terpolymer). A copolymer may be any of a random copolymer or a block copolymer.

When the method of the present invention is used to produce a block copolymer, a desired block copolymer may be produced by sequentially polymerizing monomers of each block.

For example, a block copolymer with two types of blocks may be obtained by a method comprising, for example, a step of polymerizing a first block, and a step of polymerizing a second block.

In this case, other methods may be used to polymerize one of the blocks; however, it is preferable to use the method of the present invention in both steps of polymerizing a first block and a second block. More specifically, a block copolymer with two types of blocks may be obtained by polymerizing a first block, and then carrying out the polymerization of a second block in the presence of the obtained first block polymer.

The first block polymer after isolation and purification may be subjected to the polymerization of the second block. Alternatively, the polymerization of blocks may be carried out by adding a second monomer to the first polymerization reaction system in the middle of or after the completion of the polymerization of the first block polymer, without isolation and purification of the first block polymer.

To produce a block copolymer having three or more types of blocks as well, the steps of polymerizing the respective blocks are sequentially carried out in the same manner as in the production of a copolymer having two or more types of blocks linked together, in this manner, a desired copolymer is obtained.

It is preferable to use the method of the present invention in all of the block polymerization steps.

As a dormant species, it is also possible to use a compound having a plurality of halogenated alkyl moieties. The use of a compound having two halogenated alkyl moieties enables the synthesis of, for example, a BAB-type triblock copolymer by block-copolymerization of monomer A and monomer B.

Moreover, the use of an inorganic/organic low molecule/polymer/supramolecule/solid having a plurality of halogenated alkyl moieties enables the synthesis of various branched polymers including star-type, comb-type, surface-grafted-type polymers, and the like.

In addition, the use of a polymer compound having a halogenated alkyl moiety at a terminal thereof a enables the synthesis of a block copolymer.

Therefore, for example, it is also possible to synthesize a block copolymer of a polymer synthesized by a method other than living radical polymerization and a polymer synthesized by living radical polymerization.

3. Polymer

The polymer produced by the method of the present invention has halogen (e.g., iodine) at a terminal. The terminal halogen may be removed, as required, for use as a polymer. It is also possible to convert the terminal halogen into a different functional group by a known reaction or a reaction similar to the known reaction so as to impart an additional function.

Terminal halogens generally have high reactivity, thus, the removal or conversion thereof may be carried out by a wide variety of reactions. Examples include the reaction disclosed in Handbook of Radical Polymerization; Wiley & Sona: New York, 2002. The following schemes show examples of methods for treating a polymer terminal when the terminal halogen is iodine. The used of the polymer terminal is possible in the reactions etc. shown in these schemes.

Even when the terminal halogen is not iodine, the polymer terminal may be converted into a functional group in a similar manner.

obtained by the production method of the present invention is not particularly limited. A polymer having a molecular weight (number average molecular weight and weight average molecular weight) close to a desired value may be obtained by suitably set the reaction conditions according to the purpose.

The polymer obtained with the use of the catalyst and method for producing a polymer of the present invention may be used in various applications.

For example, the polymer may be used in the production of resistor, adhesives, lubricants, paint, ink, dispersants, packaging materials, pharmaceuticals, personal care products (e.g., hairdressing materials and cosmetics), elastomers (e.g., materials for automobiles, industrial products, sports goods, materials for coating electrical wire, and materials for buildings), coating materials (e.g., materials for powder coating), and the like, in which polymers have previously been used.

Furthermore, the polymer may be used for creating a novel electronic material optical material, dynamic material, crystal material, separation material, lubricant material, and medical material.

The polymer obtained by the use of the catalyst and method for producing a polymer of the present invention

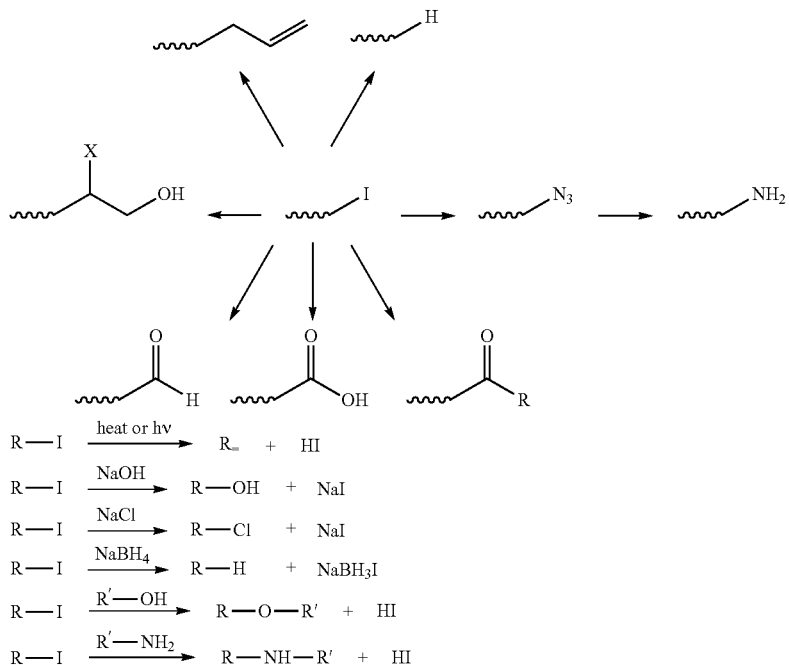

The use of the catalyst and method for producing a polymer of the present invention described above produce a polymer having a narrow molecular weight distribution.

For example, it is possible to obtain a polymer having a ratio (Mw/Mn) of the polymerization average molecular weight Mw and the number average molecular weight of 1.5 or less by selecting a suitable formulation of reaction materials and suitable reaction conditions.

It is also possible to obtain a polymer with a Mw/Mn ratio of 1.4 or lower, 1.3 or lower, 12 or lower, and further 1.1 or lower by selecting a suitable formulation of reaction materials and suitable reaction conditions.

The molecular weight (number average molecular weight and weight average molecular weight) of the polymer may also be advantageously used in various applications, considering that the amount of catalyst remaining in the polymer is low.

More specifically, it is possible to further reduce the amount of catalyst, compared to when a known transition metal-based catalyst or the like is used, achieving an increase in the purity of the obtained resin; thus, the polymer is suitably used in the applications where a high purity resin is required.

The catalyst residue may be removed or not removed from the produced polymer, depending on the application. In particular, the catalyst of the present invention is a main group-metal halide compound, which has low toxicity, and the need to remove it is minimum.

According to various applications, the polymer may be molded, or dissolved or dispersed in a solvent or a dispersion medium. Such a molded polymer, dissolved or dispersed polymer maintains the advantages of the present invention, and still encompassed in the scope of the polymer obtained by the method for producing a polymer of the present invention.

The polymer synthesized by the production method of the present invention has a narrow molecular weight distribution, has a small amount of catalyst remaining in the polymer, and is inexpensive. Due to these advantages, the polymer is usable in various applications.

The catalyst of the present invention, which contains a main group-metal halide compound, is capable of catalyzing the reversible activation of a growth terminal of a radical polymerization reaction.

EXAMPLES

The present invention is specifically described below with reference to Examples and Comparative Examples. The present invention is not limited to these Examples.

In the Examples and Comparative Examples below, abbreviations are used for the following monomer compounds.

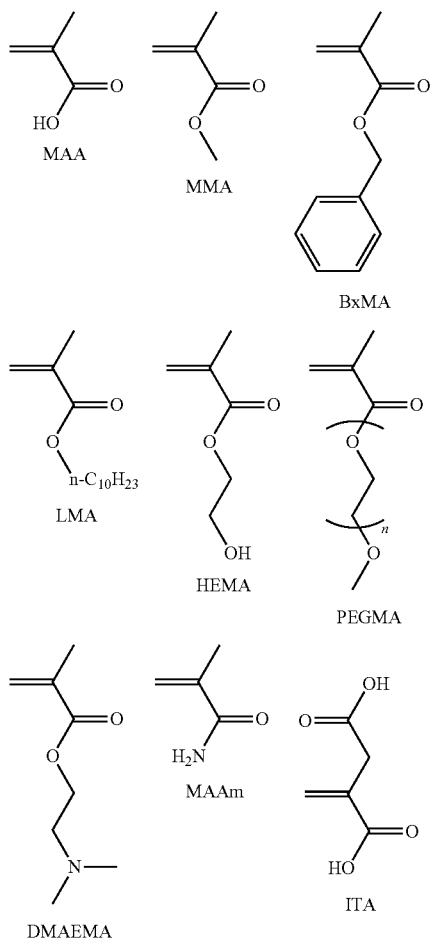

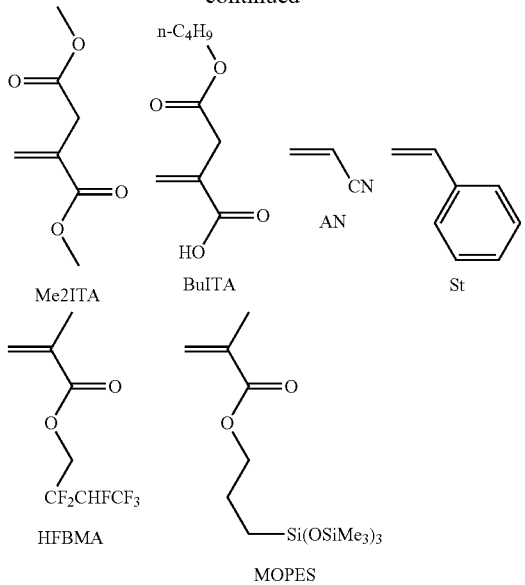

The following are abbreviations for solvents and polyether compounds.
DMDG: Diethylene glycol dimethyl ether
EC: Ethylene carbonate
DMMEA: N,N-dimethyl 2-methoxyethyl amide
DMF: Dimethylformamide The amounts of the solvent or polyether compound used are expressed as weight ratio, relative to one or more radically polymerizable monomer, unless otherwise specified separately.

The abbreviations for radical initiators and organic halides used in the Examples below are as stated above.

As a catalyst, the following were used sodium iodide (produced by Wako Pure Chemical Industries, Ltd.; purity 99.9%), potassium iodide (produced by Nacalai Tesque, Inc.; purity 99.5%), cesium iodide (produced by Wako Pure Chemical Industries, Ltd.; purity 95%), magnesium iodide (produced by Sigma-Aldrich Co.; purity: 98%), and calcium iodide (produced by Sigma-Aldrich Co.; purity: 99%).

The polydispersity index (PDI) is a numerical value obtained using:

PDI=Mw/Mn.

Here, Mw and Mn represent a weight average molecular weight and number average molecular weight, respectively, which were obtained by using gel-permeation chromatography (GPC; GPC-101 produced by Shodex) with tetrahydrofuran (THF) or dimethylformamide (DMF) as an eluate.

The following weight average molecular weights and number average molecular weights were used: in the homopolymerization of MMA, standard polymethylmethacrylate (PMMA)-equivalent molecular weights; in the homopolymerization of St, standard polystyrene (PSt)-equivalent molecular weights; and in other polymerization reactions, the molecular weights determined with a combined use of a multi-angle laser light scattering (MALLS) detector.

In the Examples, the molar ratio of each reagent is shown by setting the amount (the total amount when random copolymerization) of the radically polymerizable monomer(s) used to be 8000, based on the number of moles of 1 L of MMA at room temperature (8000 mmol), unless otherwise specified separately.

In addition to the above, the following tables, drawings, and the like use the following expressions.

$[M]_0$: Initial concentration of polymerizable monomer
$[R—X]_0$: Initial concentration of organic halide
$[X_2]_0$: Initial concentration of halogen molecule As defined in the following equation, Mn, theo is a theoretical value calculated using the initial concentration of radically polymerizable monomer, the initial concentration of dormant species, the molecular weight of radically polymerizable monomer, and the rate of polymerization (the conversion of radically polymerizable monomer).

Mn,theo=($[M]_0/[R—X]_0$)×(molecular weight of radically polymerizable monomer)×(rate of polymerization)/100

In the equation, $[M]_0$ and $[R—X]_0$ are as defined above.

When an organic halide (R—X) was generated using halogen ($X_2$), such as an iodine, and a radical initiator in the system, the Mn, theo was calculated considering the theoretical amount concentration of the generated organic halide (i.e., $2×[X_2]_0$) as $[R—X]_0$.

Example 1

2-Iodo-2-cyanopropane (CP-I) was used as an alkyl halide to be used as a dormant species. Sodium iodide was used as a catalyst. These materials were dissolved in 3 g of MMA. The molar ratio of MMA, CP-I, and sodium iodide used was 8000:80:80.

Subsequently, 50 wt % of diethylene glycol dimethyl ether (DMDG) based on the weight of the MMA was added as a solvent to dilute the mixture. The reaction solution at the time of the dissolution (the dilution) was homogeneous.

The remaining oxygen was replaced with argon, and this reaction solution was heated to 80° C. to perform a polymerization reaction. The reaction time was 120 minutes or 300 minutes. Table 1 shows the experimental results.

Examples 2 to 12

The polymerization reaction was performed as in the method described in Example 1, except that the amounts of the monomer, catalyst, solvent or polyether compound, and reagent, the temperature, and the reaction time were changed as shown in Table 1 below.

Table 1 shows the experimental results.

In Example 6.1 mol of 15-crown-5, per mole of sodium iodide was used as a polyether compound.

TABLE 1

| Example | Monomer (M) | Organic halide (R-X) | Radical initiator (I) | Catalyst (XA) | Solvent or polyether compound | Molar ratio in each reagent (M/R-X/I/XA) | Polymerization conditions Temperature (° C.) | Polymerization conditions Time (min) | Rate of polymerization (%) | Mn | Mn, theo | PDI |
|---|---|---|---|---|---|---|---|---|---|---|---|---|
| 1 | MMA | CP-I | — | NaI | DMDG 50 wt % | 8000/80/0/80 | 80 | 120 | 37.9 | 4200 | 3800 | 1.16 |
|   |     |      |   |     |              |              |    | 300 | 53.0 | 5900 | 5300 | 1.32 |
| 2 | MMA | CP-I | — | NaI | DMDG 10 wt % | 8000/80/0/80 | 80 | 120 | 46.2 | 4800 | 4600 | 1.18 |
|   |     |      |   |     |              |              |    | 300 | 67.3 | 7000 | 6700 | 1.38 |
| 3 | MMA | CP-I | — | NaI | DMDG 10 wt % | 8000/80/0/160 | 60 | 240 | 37.2 | 3600 | 3700 | 1.12 |
|   |     |      |   |     | DMDG 10 wt % |              |    | 1320 | 81.9 | 7800 | 8200 | 1.33 |
| 4 | MMA | CP-I | — | KI  | DMDG 50 wt % | 8000/80/0/80 | 90 | 120 | 26.6 | 3800 | 2700 | 1.20 |
|   |     |      |   |     |              |              |    | 300 | 37.5 | 5200 | 3800 | 1.30 |
| 5 | MMA | CP-I | — | NaI | DMDG 10 wt % | 8000/80/0/40 | 70 | 120 | 22.9 | 2900 | 2300 | 1.33 |
|   |     |      |   |     |              |              |    | 300 | 47.1 | 5000 | 4700 | 1.21 |
| 6 | MMA | CP-I | — | NaI | 15-crown-5 (1 mol per mole of NaI) | 8000/80/0/40 | 70 | 120 | 28.6 | 3400 | 2900 | 1.32 |
|   |     |      |   |     |              |              |    | 300 | 63.6 | 6700 | 6400 | 1.21 |
| 7 | AN  | CP-I | — | NaI | DMDG 10 wt % + EC 50 wt % | 8000/80/0/160 | 75 | 240 | 30.5 | 2900 | 1600 | 1.06 |
|   |     |      |   |     |              |              |    | 1320 | 100.0 | 17000 | 6000 | 1.22 |
| 8 | AN  | CP-I | — | KI  | DMDG 10 wt % + EC 50 wt % | 8000/80/0/160 | 75 | 240 | 31.9 | 3200 | 1700 | 1.08 |
|   |     |      |   |     |              |              |    | 1320 | 100.0 | 16000 | 6000 | 1.18 |
| 9 | AN  | CP-I | — | KI  | DMDG 10 wt % + EC 50 wt % | 8000/40/0/160 | 75 | 1440 | 100.0 | 17000 | 12000 | 1.34 |
| 10 | AN | CP-I | — | KI  | EC 50 wt % | 8000/80/0/160 | 75 | 240 | 29.2 | 2300 | 1500 | 1.07 |
|   |     |      |   |     |              |              |    | 1440 | 100.0 | 10000 | 8800 | 1.15 |
| 11 | AN | CP-I | — | KI  | EC 50 wt % | 8000/40/0/160 | 75 | 1440 | 100.0 | 25000 | 12000 | 1.32 |
|    |    |      |   |     |            |              |    | 120 | 20.4 | 4100 | 3600 | 1.27 |
|    |    |      |   |     |            |              |    | 240 | 40.0 | 5900 | 7000 | 1.20 |
| 12 | BzMA | CP-I | — | NaI | DMDG 10 wt % | 8000/80/0/160 | 60 | 300 | 48.9 | 7800 | 8600 | 1.18 |
|    |      |      |   |     |              |              |    | 1320 | 80.3 | 11000 | 14000 | 1.29 |

Example 13

2-Iodo-2-cyanopropane (CP-I) was used as an alkyl halide to be used as a dormant species. Sodium iodide was used as a catalyst. Further, V65 (produced by Wako Pure Chemical Industries, Ltd.) was used as a radical initiator. These materials were dissolved in 3 g of MMA. The molar ratio of MMA, CP-I, V65, and sodium iodide used was 8000:80:10:10.

Subsequently, 10 wt % of diethylene glycol dimethyl ether (DMDG) based on the weight of the MMA was added as a solvent to dilute the mixture. The reaction solution at the time of the dissolution (the dilution) was homogeneous.

The remaining oxygen was replaced with argon, and this reaction solution was heated to 60° C. to perform a polymerization reaction. The reaction time was 120 minutes or 300 minutes. Table 2 shows the experimental results.

Examples 14 to 35

The polymerization reaction was performed as in the method described in Example 13, except that the amounts of the monomer(s), catalyst, radical initiator, solvent or polyether compound, and reagent, the temperature, and the reaction time were changed as shown in Tables 2 and 3 below.

Example 35 performed random copolymerization using two types of monomers. When two or more types of monomers were used, the ratio was shown as a molar ratio in the "Monomer" column.

Tables 2 and 3 show the experimental results.

Example 36

Ethylene glycol bis(2-iodoisobutyrate) (EMA-II) was used as an alkyl halide to be used as a dormant species. Sodium iodide was used as a catalyst. Further, V65 was used as a radical initiator. These materials were dissolved in 3 g of MMA. The molar ratio of MMA, EMA-II; V65, and catalyst used was 8000:80:20.80.

Subsequently, 50 wt % of diethylene glycol dimethyl ether (DMDG) based on the weight of the MMA was added as a solvent to dilute the mixture. The reaction solution at the time of the dissolution (the dilution) was homogeneous.

TABLE 2

| Example | Monomer (M) | Organic halide (R-X) | Radical initiator (I) | Catalyst (XA) | Solvent or polyether compound | Molar ratio in each reagent (M/R-X/I/XA) | Temperature (° C.) | Time (min) | Rate of polymerization (%) | Mn | Mn, theo | PDI |
|---|---|---|---|---|---|---|---|---|---|---|---|---|
| 13 | MMA | CP-I | V65 | NaI | DMDG 10 wt % | 8000/80/10/10 | 60 | 120 | 36.5 | 3700 | 3700 | 1.20 |
|  |  |  |  |  |  |  |  | 300 | 87.9 | 7600 | 8800 | 1.17 |
| 14 | MMA | CP-I | V65 | NaI | DMDG 10 wt % | 8000/20/10/10 | 60 | 120 | 43.1 | 13000 | 17000 | 1.31 |
|  |  |  |  |  |  |  |  | 300 | 94.9 | 29000 | 38000 | 1.37 |
| 15 | MMA | CP-I | V65 | NaI | DMDG 10 wt % | 8000/80/20/1 | 60 | 120 | 52.1 | 6000 | 5200 | 1.28 |
|  |  |  |  |  |  |  |  | 300 | 90.5 | 10000 | 9100 | 1.22 |
| 16 | MMA | CP-I | V65 | MgI$_2$ | DMDG 10 wt % | 8000/80/20/80 | 60 | 120 | 23.4 | 3200 | 2300 | 1.09 |
|  |  |  |  |  |  |  |  | 300 | 90.1 | 9700 | 9000 | 1.19 |
| 17 | MMA | CP-I | V65 | MgI$_2$ | DMDG 10 wt % | 8000/80/10/2 | 60 | 120 | 27.5 | 3800 | 2800 | 1.28 |
|  |  |  |  |  |  |  |  | 300 | 63.5 | 7200 | 6400 | 1.18 |
| 18 | MMA | CP-I | V65 | MgI$_2$ | DMDG 10 wt % | 8000/80/20/1 | 60 | 120 | 54.5 | 6300 | 5500 | 1.33 |
|  |  |  |  |  |  |  |  | 300 | 91.1 | 10000 | 9200 | 1.27 |
| 19 | MMA | CP-I | V65 | CaI$_2$ | DMDG 10 wt % | 8000/80/10/80 | 60 | 120 | 32.7 | 3500 | 3300 | 1.17 |
|  |  |  |  |  |  |  |  | 300 | 92.6 | 8700 | 9300 | 1.24 |
| 20 | MMA | CP-I | V65 | CeI | DMDG 30 wt % | 8000/80/20/10 | 60 | 300 | 71.3 | 7900 | 7100 | 1.36 |
| 21 | AN | CP-I | AIBN | NaI | EC 50 wt % | 8000/80/1/160 | 75 | 300 | 41.7 | 4600 | 2200 | 1.15 |
| 22 | AN | CP-I | AIBN | KI | EC 50 wt % | 8000/80/05/160 | 75 | 300 | 100.0 | 12000 | 8500 | 1.32 |
| 23 | BzMA | CP-I | V65 | NaI | DMDG 10 wt % | 8000/80/10/20 | 60 | 120 | 60.3 | 9300 | 11000 | 1.21 |
|  |  |  |  |  |  |  |  | 300 | 87.1 | 13000 | 15000 | 1.17 |
| 24 | BzMA | CP-I | V65 | NaI | DMDG 10 wt % | 8000/80/10/10 | 60 | 120 | 46.9 | 6900 | 8300 | 1.18 |
|  |  |  |  |  |  |  |  | 300 | 86.0 | 12000 | 15000 | 1.16 |
| 25 | BzMA | CP-I | V65 | NaI | DMDG 10 wt % | 8000/20/5/10 | 60 | 120 | 35.7 | 23000 | 25000 | 1.20 |
|  |  |  |  |  |  |  |  | 300 | 83.7 | 50000 | 59000 | 1.26 |

TABLE 3

| Example | Monomer (M) | Organic halide (R-X) | Radical initiator (I) | Catalyst (XA) | Solvent or polyether compound | Molar ratio in each reagent (M/R-X/I/XA) | Temperatare (° C.) | Time (min) | Rate of polymerization (%) | Mn | Mn, theo | PDI |
|---|---|---|---|---|---|---|---|---|---|---|---|---|
| 26 | DMAEMA | CP-I | V70 | NaI | DMDG 10 wt % | 8000/80/20/80 | 50 | 120 | 65.7 | 8100 | 10000 | 1.29 |
|  |  |  |  |  |  |  |  | 300 | 87.0 | 10000 | 14000 | 1.30 |
| 27 | HEMA | CP-I | V70 | NaI | DMDG 10 wt % | 8000/80/20/80 | 50 | 120 | 93.4 | 15000 | 12000 | 1.26 |
| 28 | HEMA | CP-I | V70 | NaI | — | 8000/80/10/10 | 50 | 60 | 89.7 | 13000 | 12000 | 1.37 |
| 29 | PEGMA | CP-I | V65 | NaI | — | 8000/80/10/20 | 60 | 120 | 65.0 | 7700 | 19000 | 1.18 |
|  |  |  |  |  |  |  |  | 300 | 81.8 | 9400 | 25000 | 1.24 |
| 30 | PEGMA | CP-I | V65 | NaI | — | 8000/80/10/160 | 60 | 120 | 76.5 | 9000 | 23000 | 1.20 |
|  |  |  |  |  |  |  |  | 300 | 100.0 | 12000 | 30000 | 1.37 |
| 31 | PEGMA | CP-I | V65 | NaI | — | 8000/40/10/40 | 60 | 120 | 56.3 | 16000 | 34000 | 1.19 |
|  |  | CP-I |  |  |  |  |  | 300 | 73.0 | 21000 | 41000 | 1.33 |
| 32 | PEGMA | CP-I | V70 | NaI | Water 20 wt % | 8000/80/20/20 | 40 | 120 | 100.0 | 20000 | 30000 | 1.42 |
| 33 | LMA | CP-I | V65 | NaI | DMDG 25 wt % | 8000/80/20/20 | 60 | 120 | 43.3 | 8500 | 11000 | 1.19 |
|  |  |  |  |  |  |  |  | 300 | 80.4 | 14000 | 20000 | 1.16 |
| 34 | St | CP-I | AIBN | NaI | DMDG 10 wt % | 8000/80/40/10 | 80 | 300 | 73.2 | 6500 | 7600 | 1.40 |
| 35 | MMA/ MAA (7200:800) | CP-I | V70 | NaI | — | 8000/80/120/10 | 50 | 120 | MMA: 863 MAA: 85 | 1500 | 4700 | 1.24 |
|  |  |  |  |  |  |  |  | 300 | MMA: 913 MAA: 88 | 1600 | 3600 | 1.24 |

The remaining oxygen was replaced with argon, and this reaction solution was heated to 60° C. to perform a polymerization reaction. The reaction time was 120 minutes or 300 minutes. Table 4 shows the experimental results.

Examples 37 to 38

The polymerization reaction was performed as in the method described in Example 36, except that the amounts of the monomer, catalyst, radical initiator, solvent, and reagent, the temperature, and the reaction time were changed as shown in Table 4 below.

Table 4 shows the experimental results.

Example 39

EMA-II was used as an alkyl halide to be used as a dormant species. Sodium iodide was used as a catalyst. Further, AIBN was used as a radical initiator. These materials were dissolved in 3 g of LMA. The molar ratio of LMA, EMA-II, AIBN, and catalyst used was 8000:40:15:80.

Subsequently, 40 wt % of N,N-dimethyl 2-methoxyethyl amide (DMMEA) based on the weight of LMA was added as a solvent to dilute the mixture. The reaction solution at the time of the dissolution (the dilution) was homogeneous.

The remaining oxygen was replaced with argon, and this reaction solution was heated to 70° C. and reacted for 360 minutes. Subsequently, without carrying out purification, 1.31 g of MMA, AIBN (10 mmol based on 8000 mmol of MMA), and DMMEA (40 wt % based on the weight of MMA) were further added, and the resulting mixture was further heated to 70° C. and reacted for 240 minutes. Table 4 shows the experimental results.

In the table, the upper row shows the reagent used in the polymerization of the first block, and the lower row shows the reagent further added in the polymerization of the second block. In this manner, a block copolymer of LMA and MMA was obtained.

Example 40

Iodine ($I_2$) was used as halogen, and V70 (produced by Wako Pure Chemical Industries, Ltd.) was used as a radical initiator. Sodium iodide was used as a catalyst. These materials were dissolved in 3 g of MMA. The molar ratio of MMA, iodine, V70, and catalyst used was 8000:40:70:10.

Subsequently, 10 wt % of DMDG based on the weight of MMA was added as a solvent to dilute the mixture. The reaction solution at the time of the dissolution (the dilution) was homogeneous.

The remaining oxygen was replaced with argon, and this reaction solution was heated to 65° C. to perform a polymerization reaction. The reaction time was 120 minutes or 300 minutes. Table 5 shows the experimental results.

Examples 41 to 66

The polymerization reaction was performed as in the method described in Example 40, except that the amounts of the monomer(s), catalyst, radical initiator, solvent, and reagent, the temperature, and the reaction time were changed as shown in Tables 5 and 6 below.

Examples 61 to 66 performed random copolymerization using two types of monomers. When two or more types of monomers or radical initiators were used, the ratio was shown as a molar ratio in the "Monomer" column or the "Radical initiator" column.

Tables 5 and 6 show the experimental results.

TABLE 4

| Example | Monomer (M) | Organic halide (R-X) | Radical initiator (I) | Catalyst (XA) | Solvent or polyether compound | Molar ratio in each reagent (M/R-X/I/XA) | Polymerization conditions Temperatare (° C.) | Time (min) | Rate of polymer-ization (%) | Mn | Mn, theo | PDI |
|---|---|---|---|---|---|---|---|---|---|---|---|---|
| 36 | LMA | EMA-II | V65 | NaI | DMDG 50 wt % | 8000/80/20/80 | 70 | 180 | 68.7 | 14000 | 17000 | 1.38 |
|   |   |   |   |   |   |   |   | 300 | 78.2 | 14000 | 20000 | 1.40 |
| 37 | LMA | EMA-II | AIBN | NaI | DMMEA 25 wt % | 8000/40/20/80 | 70 | 300 | 93.2 | 38000 | 47000 | 1.33 |
| 38 | LMA | EMA-II | AIBN | NaI | DMMEA 50 wt % | 8000/40/15/80 | 70 | 120 | 39.0 | 17000 | 20000 | 1.31 |
|   |   |   |   |   |   |   |   | 300 | 88.1 | 28000 | 45000 | 1.36 |
| 39 | LMA | EMA-II | AIBN | NaI | DMMEA 40 wt % | 8000/40/15/80 | 70 | 360 | 78.5 | 29000 | 40000 | 1.33 |
|   | +MMA | — | AIBN | — | DMMEA 40 wt % | 8000/0/10/0 | 70 | 240 | 64.3 | 36000 | 33000 | 1.38 |

TABLE 5

| Example | Monomer (M) | Dormant species X₂ | Radical initiator (I) | Catalyst (XA) | Solvent or polyether compound | Molar ratio in each reagent (M/X₂/I/XA) | Polymerization conditions Temperature (°C.) | Time (min) | Rate of polymerization (%) | Mn | Mn, theo | PDI |
|---|---|---|---|---|---|---|---|---|---|---|---|---|
| 40 | MMA | I₂ | V70 | NaI | DMDG 10 wt % | 8000/40/70/10 | 65 | 120 | 79.4 | 6800 | 8000 | 1.17 |
|    |     |    |     |     |              |                |    | 300 | 90.0 | 7500 | 9000 | 1.19 |
| 41 | MMA | I₂ | V65 | NaI | DMDG 10 wt % | 8000/40/70/10 | 65 | 300 | 88.9 | 8600 | 8900 | 1.17 |
| 42 | MMA | I₂ | V65 | NaI | DMDG 50 wt % | 8000/40/90/10 | 65 | 120 | 20.9 | 2500 | 2100 | 1.13 |
|    |     |    |     |     |              |                |    | 300 | 71.4 | 6100 | 7100 | 1.25 |
| 43 | MMA | I₂ | V70/V65 (70:30) | NaI | DMDG 50 wt % | 8000/40/100/10 | 65 | 120 | 64.9 | 5500 | 6500 | 1.24 |
|    |     |    |     |     |              |                |    | 300 | 82.1 | 6500 | 8200 | 1.27 |
| 44 | MMA | I₂ | V70/V65 (35:20) | NaI | DMDG 50 wt % | 8000/20/55/10 | 65 | 120 | 62.3 | 9200 | 12000 | 1.39 |
|    |     |    |     |     |              |                |    | 300 | 81.8 | 11000 | 16000 | 1.43 |
| 45 | MMA | I₂ | V65 | NaI | DMDG 50 wt % | 8000/10/25/10 | 65 | 120 | 26.4 | 9600 | 11000 | 1.28 |
|    |     |    |     |     |              |                |    | 300 | 68.9 | 18000 | 28000 | 1.46 |
| 46 | MMA | I₂ | V65 | MgI₂ | DMDG 10 wt % | 8000/40/80/10 | 60 | 390 | 87.8 | 10000 | 8800 | 1.17 |
| 47 | MMA | I₂ | V65 | CaI₂ | DMDG 10 wt % | 8000/40/80/10 | 60 | 390 | 84.4 | 11000 | 8400 | 1.23 |
| 48 | MMA | I₂ | V65 | CeI | DMDG 30 wt % | 8000/40/80/10 | 60 | 390 | 54.9 | 7000 | 5500 | 1.16 |
| 49 | AN | I₂ | V70 | KI | EC 50 wt % | 8000/40/50/160 | 75 | 240 | 72.1 | 6400 | 3800 | 1.36 |
|    |     |    |     |     |              |                |    | 1440 | 100.0 | 18000 | 6000 | 1.30 |
| 50 | BzMA | I₂ | V70/V65 (70:20) | NaI | DMDG 50 wt % | 8000/40/90/10 | 60 | 120 | 55.3 | 8100 | 9700 | 1.21 |
|    |     |    |     |     |              |                |    | 300 | 74.6 | 10000 | 13000 | 1.26 |
| 51 | BzMA | I₂ | V70/V65 (70:30) | NaI | DMDG 50 wt % | 8000/40/100/10 | 65 | 120 | 67.7 | 9000 | 12000 | 1.28 |
|    |     |    |     |     |              |                |    | 300 | 78.9 | 9900 | 14000 | 1.34 |
| 52 | BzMA | I₂ | V70/V65 (35:20) | NaI | DMDG 50 wt % | 8000/20/55/10 | 60 | 120 | 57.0 | 12000 | 20000 | 1.36 |
|    |     |    |     |     |              |                |    | 300 | 76.9 | 15000 | 27000 | 1.46 |
| 53 | BzMA | I₂ | V70/V65 (17.5:10) | NaI | DMDG 50 wt % | 8000/10/275/10 | 60 | 120 | 47.1 | 18000 | 33000 | 1.38 |
|    |     |    |     |     |              |                |    | 300 | 70.6 | 25000 | 50000 | 1.48 |
| 54 | DMAEMA | I₂ | V70 | NaI | DMDG 10 wt % | 8000/40/40/80 | 50 | 120 | 30.3 | 10000 | 4800 | 1.36 |
|    |     |    |     |     |              |                |    | 300 | 100.0 | 20000 | 16000 | 1.46 |
| 55 | HEMA | I₂ | V70 | NaI | DMDG 10 wt % | 8000/40/80/10 | 50 | 180 | 100.0 | 21000 | 15000 | 1.36 |
| 56 | LMA | I₂ | V70/V65 (70:20) | NaI | DMDG 25 wt % | 8000/40/90/80 | 65 | 120 | 76.5 | 14000 | 19000 | 1.18 |
|    |     |    |     |     |              |                |    | 300 | 94.7 | 16000 | 24000 | 1.18 |
| 57 | LMA | I₂ | V70/V65 (70:30) | NaI | DMDG 50 wt % | 8000/40/100/80 | 65 | 120 | 72.3 | 13000 | 18000 | 1.33 |
|    |     |    |     |     |              |                |    | 300 | 84.9 | 15000 | 22000 | 1.32 |

TABLE 6

| Example | Monomer (M) | Dormant species X₂ | Radical initiator (I) | Catalyst (XA) | Solvent or polyether compound | Molar ratio in each reagent (M/X₂/I/XA) | Polymerization conditions Temperature (°C.) | Time (min) | Rate of polymerization (%) | Mn | Mn, theo | PDI |
|---|---|---|---|---|---|---|---|---|---|---|---|---|
| 58 | LMA | I₂ | V70/V65 (70:20) | NaI | DMDG 50 wt % | 8000/40/90/80 | 65 | 120 | 61.4 | 9500 | 16000 | 1.19 |
|    |     |    |     |     |              |                |    | 300 | 81.3 | 12000 | 21000 | 1.21 |
| 59 | LMA | I₂ | V70/V65 (35:10) | NaI | DMDG 25 wt % | 8000/20/45/10 | 65 | 120 | 54.6 | 20000 | 28000 | 1.26 |
|    |     |    |     |     |              |                |    | 300 | 79.0 | 27000 | 40000 | 1.26 |
| 60 | St | I₂ | AIBN | NaI | DMDG 10 wt % | 8000/40/100/10 | 80 | 300 | 78.6 | 7000 | 8200 | 1.43 |
| 61 | MAAm/MMA (4000:4000) | I₂ | V70/V65 (80:80) | NaI | DMF 80 wt % | 8000/40/160/80 | 60 | 120 | MMA: 60.2 MAAm: 23.9 | 7500 | 4200 | 1.45 |
|    |     |    |     |     |              |                |    | 300 | MMA: 86.7 MAAm: 47.0 | 8700 | 7700 | 1.46 |
| 62 | MAAm/MMA (4000:4000) | I₂ | V70/V65 (40:80) | NaI | DMF 80 wt % | 8000/20/120/80 | 60 | 120 | MMA: 65.5 MAAm:28.0 | 12000 | 10000 | 1.49 |
|    |     |    |     |     |              |                |    | 300 | MMA: 89.2 MAAm: 51.0 | 12000 | 17000 | 1.47 |
| 63 | ITA/MMA (800:7200) | I₂ | V70 | NaI | DMF 60 wt % | 8000/40/160/80 | 50 | 120 | MMA: 41.0 ITA: 20 | 4700 | 1100 | 1.22 |
|    |     |    |     |     |              |                |    | 300 | MMA:47.6 ITA: 24 | 4400 | 1300 | 1.26 |
| 64 | Me₂ITA/MMA (4000:4000) | I₂ | V70 | NaI | DMF 60 wt % | 8000/40/160/80 | 50 | 120 | MMA: 38.5 Me₂ITA: 17.9 | 3000 | 1400 | 1.16 |
|    |     |    |     |     |              |                |    | 300 | MMA: 55.1 Me₂ITA: 28.3 | 4500 | 2700 | 1.26 |
| 65 | BuITA/MMA (800:7200) | I₂ | V70 | NaI | DMF 60 wt % | 8000/40/160/80 | 50 | 120 | MMA: 43.2 BuITA: 24 | 3500 | 1300 | 1.16 |
|    |     |    |     |     |              |                |    | 300 | MMA: 52.9 BuITA: 28 | 3600 | 1500 | 1.20 |
| 66 | MMA/MAA (7200:800) | I₂ | V70 | NaI | — | 8000/40/120/10 | 50 | 120 | MMA: 55.4 MMA:52 | 1500 | 1600 | 1.21 |
|    |     |    |     |     |              |                |    | 300 | MMA: 75.9 MMA:72 | 1600 | 3600 | 1.23 |

Based on the above Examples, FIG. 11 shows graphs plotting the "reaction time" versus (In[M]$_0$/[M])," the "rate of polymerization" versus "Mw/Mn," and the "rate of polymerization" versus "Mn/1000," with respect to when diethylene glycol diethyl ether (DMDG) was used in an amount of 10% or 50%.

Figure 2:
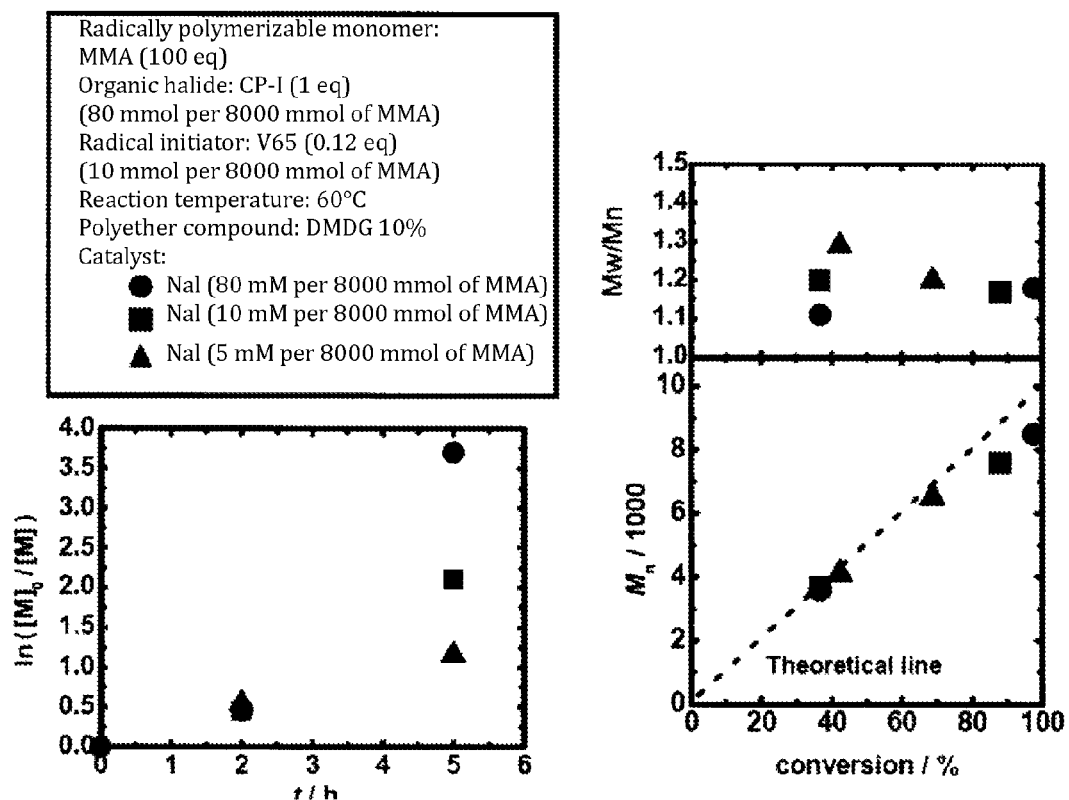
FIG. 2 shows graphs plotting the "reaction time" versus (In[M]$_0$/[M])," the "rate of polymerization" versus "Mw/Mn," and the "rate of polymerization" versus "Mn/1000," with respect to the amount of the catalyst of the present invention used.

Based on the above Examples, FIG. 2 shows graphs plotting the "reaction time" versus (In[M]$_0$/[M])," the "rate of polymerization" versus "Mw/Mn," and the "rate of polymerization" versus "Mn/1000," with respect to when the catalyst was used is an amount of 5 mmol, 10 mmol, or 80 mmol, per 800 mmol of the radically polymerizable monomer.

Examples 67 to 72

The polymerization reaction was performed as in the method described in Example 1, except that the amounts of the monomer, catalyst, solvent or polyether compound, and reagent, the temperature, and the reaction time were changed as shown in Table 7 below.

Table 7 shows the experimental results.

In Examples 69 to 72, 1 mol of crown ether, per mole of sodium iodide or potassium iodide, was used as a polyether compound.

TABLE 7

| Example | Monomer (M) | Organic halide (R-X) | Radical initiator (I) | Catalyst (XA) | Solvent or polyether compound | Molar ratio in each reagent (M/R-X/I/XA) | Polymerization conditions Temperature (° C.) | Time (min) | Rate of polymerization (%) | Mn | Mn, theo | PDI |
|---|---|---|---|---|---|---|---|---|---|---|---|---|
| 67 | MMA | CP-I | — | NaI | DMDG 10 wt % | 8000/80/0/40 | 70 | 120 | 20.1 | 2300 | 2000 | 1.22 |
|  |  |  |  |  |  |  |  | 180 | 30.5 | 3200 | 3000 | 1.19 |
|  |  |  |  |  |  |  |  | 240 | 38.4 | 4100 | 3700 | 1.16 |
|  |  |  |  |  |  |  |  | 300 | 45.9 | 4700 | 4500 | 1.20 |
|  |  |  |  |  |  |  |  | 360 | 51.0 | 5000 | 5000 | 1.22 |
|  |  |  |  |  |  |  |  | 480 | 57.3 | 5300 | 5600 | 1.27 |
| 68 | MMA | CP-I | — | NaI | DMDG 3 wt % | 8000/80/0/40 | 70 | 120 | 13.4 | 2000 | 1300 | 1.33 |
|  |  |  |  |  |  |  |  | 180 | 20.3 | 2600 | 2000 | 1.27 |
|  |  |  |  |  |  |  |  | 240 | 25.8 | 3100 | 2500 | 1.24 |
|  |  |  |  |  |  |  |  | 300 | 30.0 | 3600 | 2900 | 1.21 |
|  |  |  |  |  |  |  |  | 360 | 33.6 | 4000 | 3300 | 1.21 |
|  |  |  |  |  |  |  |  | 480 | 38.3 | 4400 | 3700 | 1.23 |
| 69 | MMA | CP-I | — | NaI | 18-crown-6 (1 mole per mole of NaI) | 8000/80/0/40 | 70 | 60 | 31.1 | 3700 | 3000 | 1.17 |
|  |  |  |  |  |  |  |  | 120 | 58.9 | 5800 | 5700 | 1.14 |
|  |  |  |  |  |  |  |  | 180 | 74.6 | 7500 | 7300 | 1.16 |
|  |  |  |  |  |  |  |  | 240 | 83.1 | 8200 | 7600 | 1.16 |
| 70 | MMA | CP-I | — | NaI | 12-crown-4 (1 mole per mole of NaI) | 8000/80/0/40 | 70 | 120 | 21.0 | 2400 | 2000 | 1.39 |
|  |  |  |  |  |  |  |  | 180 | 31.6 | 3500 | 3100 | 1.24 |
|  |  |  |  |  |  |  |  | 240 | 41.9 | 4400 | 4100 | 1.19 |
|  |  |  |  |  |  |  |  | 300 | 49.7 | 5200 | 4800 | 1.19 |
|  |  |  |  |  |  |  |  | 360 | 53.3 | 5700 | 5200 | 1.21 |
|  |  |  |  |  |  |  |  | 480 | 59.6 | 6500 | 5800 | 1.25 |
| 71 | MMA | CP-I | — | KI | 18-crown-6 (1 mole per mole of KI) | 8000/80/0/40 | 70 | 60 | 22.4 | 3100 | 2200 | 1.34 |
|  |  |  |  |  |  |  |  | 120 | 48.4 | 4700 | 4700 | 1.23 |
|  |  |  |  |  |  |  |  | 180 | 65.6 | 6600 | 6400 | 1.18 |
|  |  |  |  |  |  |  |  | 240 | 75.3 | 7500 | 7300 | 1.19 |
|  |  |  |  |  |  |  |  | 300 | 79.3 | 7900 | 7600 | 1.22 |
|  |  |  |  |  |  |  |  | 360 | 82.2 | 8500 | 8000 | 1.24 |
| 72 | MMA | CP-I | — | KI | 15-crown-5 (1 mole per mole of KI) | 8000/80/0/40 | 70 | 120 | 15.6 | 2000 | 1500 | 1.35 |
|  |  |  |  |  |  |  |  | 180 | 27.7 | 3100 | 2700 | 1.21 |
|  |  |  |  |  |  |  |  | 240 | 37.4 | 4200 | 3600 | 1.18 |
|  |  |  |  |  |  |  |  | 300 | 45.8 | 5000 | 4400 | 1.17 |
|  |  |  |  |  |  |  |  | 360 | 55.0 | 5800 | 5300 | 1.19 |
|  |  |  |  |  |  |  |  | 483 | 66.1 | 7400 | 6400 | 1.25 |

Figure 3:
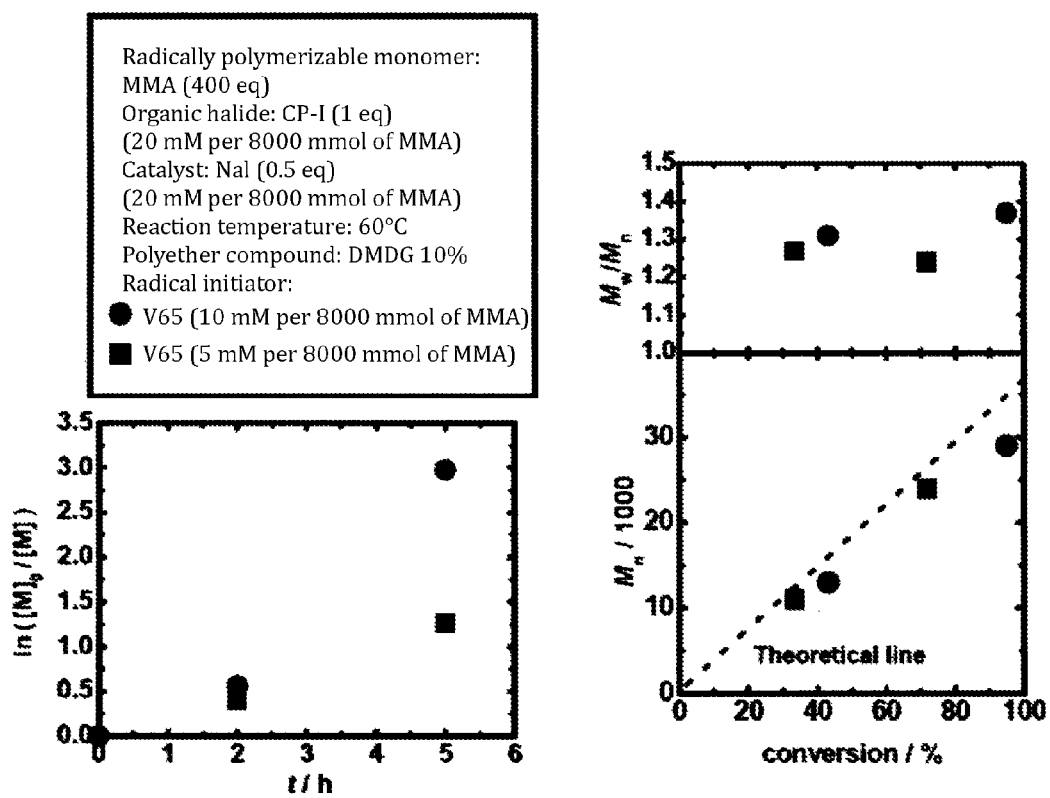
FIG. 3 shows graphs plotting the "reaction time" versus (In[M]$_0$/[M])," the "rate of polymerization" versus "Mw/Mn," and the "rate of polymerization" versus "Mn/1000," with respect to the amount of a radical initiator used.

Based on the above Examples, FIG. 3 shows graphs plotting the "reaction time" versus "(In[M]$_0$/[M])," the "rate of polymerization" versus "Mw/Mn," and the "rate of polymerization" versus "Mn/1000," with respect to when the radical initiator (V65) was used in an amount of 5 mmol or 10 mmol, per 8000 mmol of the radically polymerizable monomer.

Examples 73 to 78

The polymerization reaction was performed as in the method described in Example 13, except that the amounts of the monomer, catalyst, radical initiator, solvent or polyether compound, and reagent, the temperature, and the reaction time were changed as shown in Table 8 below.

Table 8 shows the experimental results.

TABLE 8

| Example | Monomer (M) | Organic halide (R-X) | Radical initiator (I) | Catalyst (XA) | Solvent or polyether compound | Molar ratio in each reagent (M/R-X/I/XA) | Polymerization conditions Temperatare (° C.) | Polymerization conditions Temperatare (° C.) | Rate of polymerization (%) | Mn | Mn, theo | PDI |
|---|---|---|---|---|---|---|---|---|---|---|---|---|
| 73 | MMA | CP-I | V65 | NaI | DMDG 10 wt % | 8000/80/20/40 | 60 | 60 | 19.6 | 2400 | 1900 | 1.19 |
|  |  |  |  |  |  |  |  | 120 | 47.1 | 4800 | 4600 | 1.14 |
|  |  |  |  |  |  |  |  | 180 | 93.4 | 9000 | 9100 | 1.14 |
| 74 | MMA | CP-I | V70 | NaI | 1,4-dioxane 40 wt % | 8000/80/20/10 | 45 | 240 | 33.0 | 4200 | 3200 | 1.35 |
|  |  |  |  |  |  |  |  | 360 | 47.0 | 4800 | 4600 | 1.36 |
| 75 | PEGMA | CP-I | V70 | NaI | Water 20 wt % | 8000/80/20/160 | 40 | 120 | 100.0 | 17000 | 30000 | 1.31 |
| 76 | HEMA | CP-I | V70 | NaI | DMDG 40 wt % | 8000/80/20/10 | 50 | 300 | 80.5 | 12000 | 10000 | 1.37 |
| 77 | HEMA | CP-I | V70 | NaI | Ethanol 25 wt % | 8000/80/20/10 | 40 | 235 | 66.6 | 7400 | 8600 | 1.23 |
| 78 | HEMA | CP-I | V70 | NaI | Butyl acetate 25 wt % | 8000/80/20/10 | 40 | 180 | 96.7 | 9500 | 12600 | 1.36 |

Examples 79 to 82

The polymerization reaction was performed as in the method described in Example 40, except that the amounts of the monomer, catalyst, radical initiator, solvent, and reagent, the temperature, and the reaction time were changed as shown in Table 9 below.

When two or more kinds of radical initiators were used, the ratio was shown as a molar ratio in the "Radical Initiator" column. Table 9 shows the experimental results.

TABLE 9

| Example | Monomer (M) | Organic halide (R-X) | Radical initiator (I) | Catalyst (XA) | Solvent or polyether compound | Molar ratio in each reagent (M/R-X/I/XA) | Polymerization conditions Temperatare (° C.) | Polymerization conditions Temperatare (° C.) | Rate of polymerization (%) | Mn | Mn, theo | PDI |
|---|---|---|---|---|---|---|---|---|---|---|---|---|
| 79 | PEGMA | I$_2$ | V70 | NaI | Water 20 wt % | 8000/40/120/20 | 40 | 300 | 74.9 | 19000 | 22000 | 1.31 |
| 80 | PEGMA | I$_2$ | V70 | NaI | Water 50 wt % | 8000/40/120/20 | 40 | 300 | 30.7 | 9400 | 9200 | 1.21 |
| 81 | HFBMA | I$_2$ | V70/V65 (400:100) | NaI | Ethanol 30 wt % | 8000/200/500/20 | 60 | 240 | 94.3 | 3200 | — | 1.19 |
| 82 | MOPES | I$_2$ | V70/V65 (400:100) | NaI | Ethanol 30 wt % | 8000/200/500/20 | 60 | 240 | 89.1 | 5400 | — | 1.41 |

The invention claimed is:

1. A living radical polymerization catalyst consisting of at least one member selected from the group consisting of alkali metal halide compounds and alkaline earth metal halide compounds.

2. The living radical polymerization catalyst according to claim 1, consisting of at least one member selected from the group consisting of alkali metal iodide compounds and alkaline earth metal iodide compounds.

3. The living radical polymerization catalyst according to claim 1, consisting of at least one member selected from the group consisting of sodium iodide and potassium iodide.

4. A method for producing a polymer by living radical polymerization of one or more radically polymerizable monomers, the method comprising:
a step of performing living radical polymerization using the living radical polymerization catalyst of claim 1.

5. The method for producing a polymer according to claim 4, wherein the catalyst is used in an amount of 0.000125 to 1 mol, per mole of the one or more radically polymerizable monomers.

6. The method for producing a polymer according to claim 4, wherein the living radical polymerization reaction is further performed by adding a polyether compound.

7. The method for producing a polymer according to claim 6, wherein the polyether compound is used in an amount of 1 mol or more, per mole of the living radical polymerization catalyst, and 10000 parts by weight or less, per 100 parts by weight of the one or more radically polymerizable monomers.

8. The living radical polymerization catalyst according to claim 2, consisting of at least one member selected from the group consisting of sodium iodide and potassium iodide.

9. A method for producing a polymer by living radical polymerization of one or more radically polymerizable monomers, the method comprising:
a step of performing living radical polymerization using the living radical polymerization catalyst of claim 2.

10. A method for producing a polymer by living radical polymerization of one or more radically polymerizable monomers, the method comprising:
a step of performing living radical polymerization using the living radical polymerization catalyst of claim 3.

11. The method for producing a polymer according to claim 5, wherein the living radical polymerization reaction is further performed by adding a polyether compound.

* * * * *